United States Patent
Matsumoto et al.

(10) Patent No.: US 11,867,588 B2
(45) Date of Patent: Jan. 9, 2024

(54) TIRE TESTING DEVICE

(71) Applicant: KOKUSAI KEISOKUKI KABUSHIKI KAISHA, Tama (JP)

(72) Inventors: Sigeru Matsumoto, Tokyo (JP); Hiroshi Miyashita, Tokyo (JP); Kazuhiro Murauchi, Tokyo (JP); Shuichi Tokita, Kanagawa (JP)

(73) Assignee: KOKUSAI KEISOKUKI KABUSHIKI KAISHA, Tokyo (JP)

(*) Notice: Subject to any disclaimer, the term of this patent is extended or adjusted under 35 U.S.C. 154(b) by 597 days.

(21) Appl. No.: 17/071,252

(22) Filed: Oct. 15, 2020

(65) Prior Publication Data

US 2021/0025784 A1 Jan. 28, 2021

Related U.S. Application Data

(63) Continuation-in-part of application No. PCT/JP2019/016890, filed on Apr. 19, 2019.

(30) Foreign Application Priority Data

Apr. 20, 2018 (JP) .................................. 2018-081379
May 11, 2018 (JP) .................................. 2018-092607

(51) Int. Cl.
  *G01M 17/02* (2006.01)
  *B60C 19/00* (2006.01)
  *B60C 25/00* (2006.01)

(52) U.S. Cl.
  CPC ............. *G01M 17/02* (2013.01); *B60C 19/00* (2013.01); *B60C 25/002* (2013.01); *G01M 17/021* (2013.01); *B60C 2019/004* (2013.01)

(58) Field of Classification Search
  None
  See application file for complete search history.

(56) References Cited

U.S. PATENT DOCUMENTS 3,878,712 A * 4/1975 Chapin ................. G01L 17/005
  73/146
4,344,324 A * 8/1982 Langer ................ G01M 17/022
  73/146

(Continued)

FOREIGN PATENT DOCUMENTS

CN  202851645 U  4/2013
CN  107367396 A  11/2017

(Continued)

OTHER PUBLICATIONS

Jan. 31, 2022 International Preliminary Report on Patentability issued in Patent Application No. PCT/JP2020/040018.

(Continued)

*Primary Examiner* — Christopher W Fulton
(74) *Attorney, Agent, or Firm* — Oliff PLC

(57) ABSTRACT

A tire testing device includes a carriage configured to rotatably hold a test wheel provided with a test tire and being capable of travelling on a base along a road surface in a state where the test wheel is made to contact the road surface, and a driving system configured to drive the test wheel and the carriage. The driving system includes a carriage driving part configured to drive the carriage with respect to the road surface in a predetermined speed, a test wheel driving part configured to drive the test wheel in a rotating speed corresponding to the predetermined speed, a driving part configured to generate power to be used to drive the carriage and the test wheel, and a power distributing part configured to distribute power generated by the driving part to the carriage driving part and the test wheel driving part.

22 Claims, 26 Drawing Sheets

(56) References Cited

U.S. PATENT DOCUMENTS

| | | | | |
|---|---|---|---|---|
| 4,458,527 | A | * 7/1984 | McFarland | G01M 17/022 73/146 |
| 4,848,143 | A | * 7/1989 | Ushikoshi | G01M 17/022 73/146 |
| 4,958,512 | A | * 9/1990 | Johnsen | B60T 8/52 73/146 |
| 5,289,718 | A | * 3/1994 | Mousseau | G01M 17/02 73/146 |
| 6,094,979 | A | * 8/2000 | Haslett | G01L 17/005 73/146 |
| 7,509,847 | B2 | * 3/2009 | Halliday | G01N 19/02 73/146 |
| 7,908,917 | B2 | * 3/2011 | Kitagawa | G01M 17/022 73/146 |
| 8,776,587 | B2 | * 7/2014 | Sumitani | G01M 17/021 73/146 |
| 8,869,618 | B2 | * 10/2014 | Wakao | G01M 17/025 73/146 |
| 10,371,603 | B2 | * 8/2019 | Koike | G01M 17/02 |
| 2003/0061719 | A1 | 4/2003 | Gerdes | |
| 2007/0280573 | A1 | 12/2007 | Yoshikawa et al. | |
| 2008/0282789 | A1 | 11/2008 | Regis et al. | |
| 2010/0254648 | A1 | 10/2010 | Yoshikawa et al. | |
| 2011/0048120 | A1 | 3/2011 | Dank et al. | |
| 2012/0260726 | A1 | 10/2012 | Cuttino | |
| 2013/0006514 | A1 | 1/2013 | Martin et al. | |
| 2014/0090461 | A1 | 4/2014 | Cuttino | |
| 2014/0250997 | A1 | * 9/2014 | Sprenger | G01M 17/02 73/146 |
| 2016/0054199 | A1 | 2/2016 | Fritz et al. | |
| 2021/0025784 | A1 | 1/2021 | Matsumoto et al. | |

FOREIGN PATENT DOCUMENTS

| | | | |
|---|---|---|---|
| EP | 2192567 | A1 | 6/2010 |
| EP | 2 192 567 | B1 | 8/2016 |
| JP | H08-64564 | A | 3/1996 |
| JP | 2003269948 | A | 9/2003 |
| JP | 2007-522467 | A | 8/2007 |
| JP | 2007-309508 | A | 11/2007 |
| JP | 2009-180715 | A | 8/2009 |
| JP | 2013-520667 | A | 6/2013 |
| JP | 2013-156087 | A | 8/2013 |
| JP | 2014-020807 | A | 2/2014 |
| JP | 2014-181958 | A | 9/2014 |
| JP | 2015-072215 | A | 4/2015 |
| JP | 2016-080414 | A | 5/2016 |
| KR | 102005187 | B1 | 7/2019 |
| WO | 2019203359 | A1 | 10/2019 |

OTHER PUBLICATIONS

Dec. 28, 2021 International Search Report issued in International Patent Application No. PCT/JP2021/035867.

U.S. Appl. No. 18/182,433, filed Mar. 13, 2023 in the name of Matsumoto et al.

Jul. 23, 2019 International Search Report issued in International Patent Application No. PCT/JP2019/016890.

Aug. 12, 2020 International Preliminary Report on Patentability issued in International Patent Application No. PCT/JP2019/016890.

Aug. 8, 2022 Office Action issued in Chinese Patent Application No. 201980027057.1.

Feb. 7, 2022 Extended European Search Report issued in European Patent Application No. 19788227.7.

Dec. 28, 2020 International Search Report issued in International Application No. PCT/JP2020/040018.

U.S. Appl. No. 17/718,589, filed Apr. 12, 2022 in the name of Matsumoto et al.

Jul. 31, 2023 Office Action issued in Japanese Patent Application No. 2019-194640.

Sep. 6, 2023 European Search Report issued in European Patent Application No. 20879611.0.

* cited by examiner

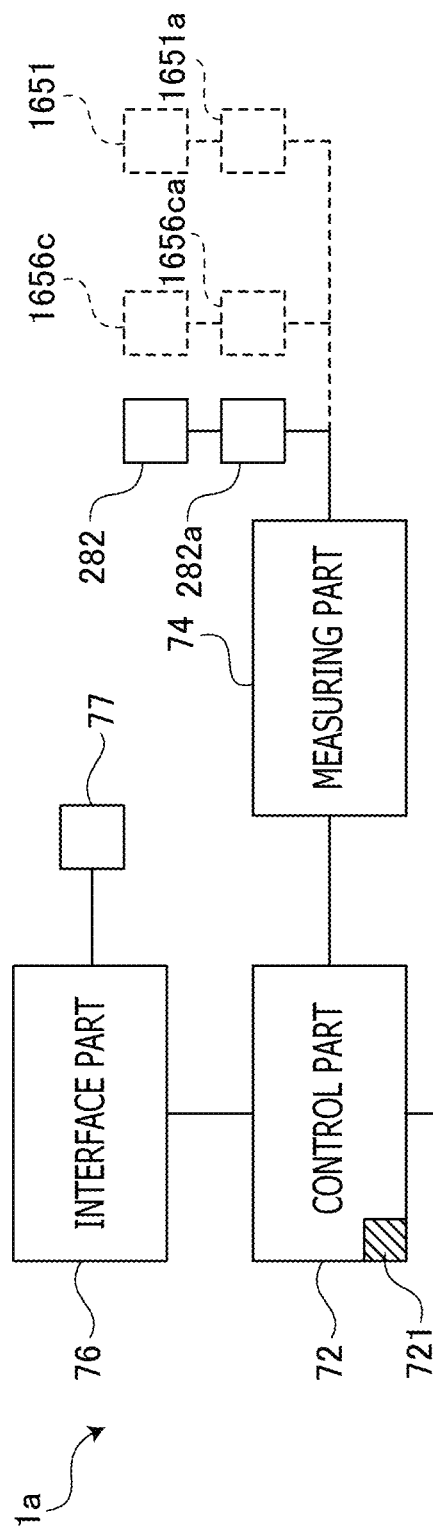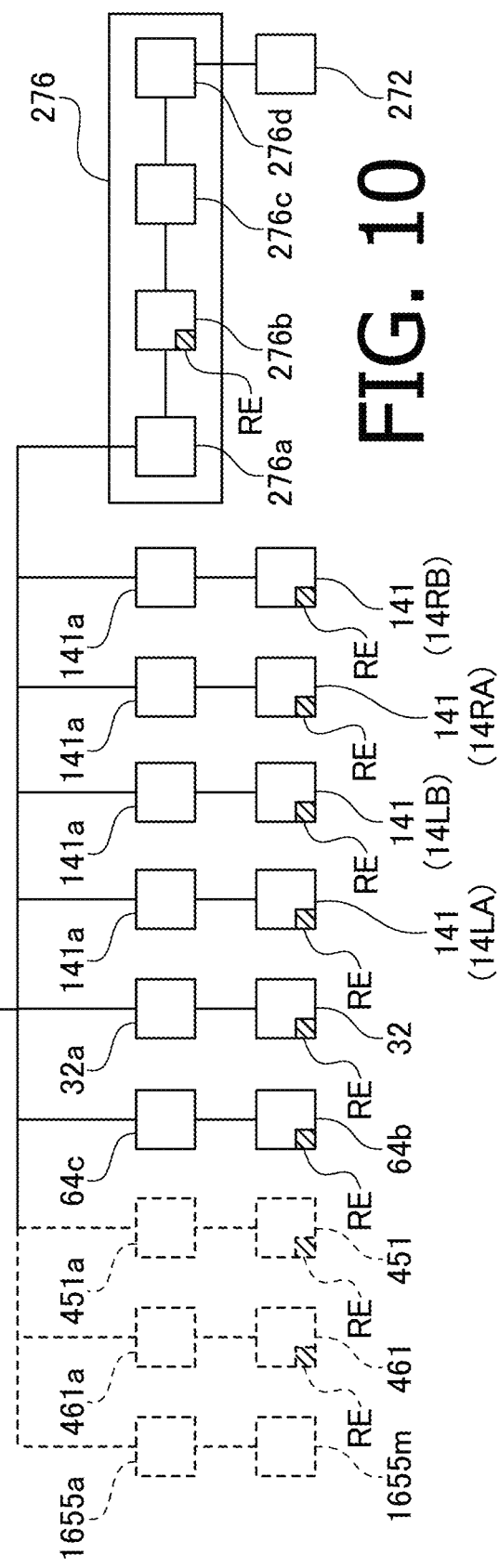
FIG. 10

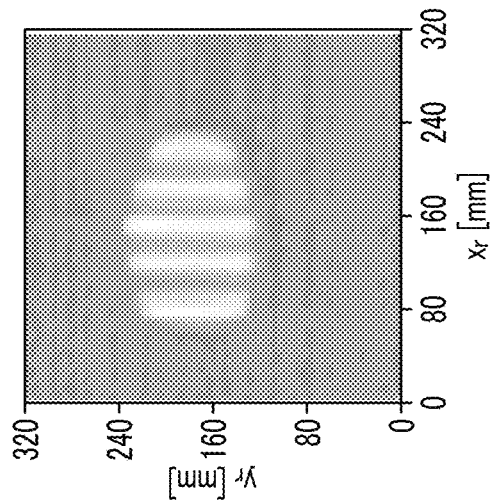
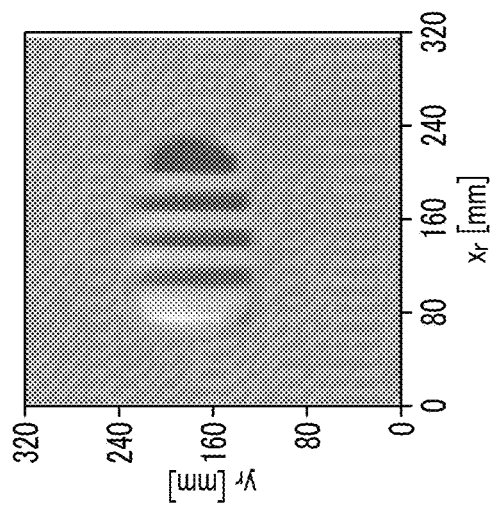
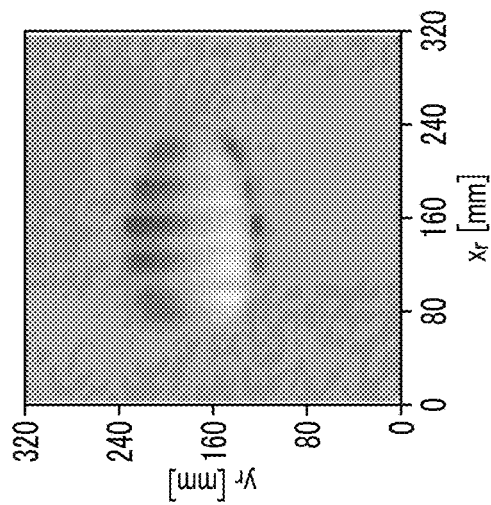
FIG. 26C
FIG. 26B
FIG. 26A

TIRE TESTING DEVICE

CROSS-REFERENCE TO RELATED APPLICATION

This is a Continuation-in-Part of International Application No. PCT/JP2019/016890 filed on Apr. 19, 2019, which claims priority from Japanese Patent Application No. 2018-081379 filed on Apr. 20, 2018 and Japanese Patent Application No. 2018-092607 filed on May 11, 2018. The entire disclosures of the prior applications are incorporated herein by reference.

BACKGROUND

Technical Field

The present disclosure relates to tire testing devices.

Related Art

Since tire performance is influenced by conditions of road surfaces, the tire performance needs to be evaluated for road surfaces of various conditions.

As tests for evaluating the tire performance, an on-road test in which test tires are for example mounted to wheel rims of a test-dedicated vehicle and the test-dedicated vehicle is made to run on actual roads and an indoor test in which a testing device installed indoor is used are known.

A conventional testing device to be used in the indoor tire test includes a rotating drum to which a simulated road surface is provided on its outer peripheral surface, and the test is performed by causing a test tire and the drum to rotate in a state where the test tire is made to contact with the simulated road surface.

SUMMARY

The indoor test is more accurate and more efficient than the on-road test. However, in the conventional testing device for the indoor test, since the simulated road surface is made to run at high speed during the test, it is difficult to perform the test in road surface conditions in which the road surface is covered with rain, snow, gravel or the like.

Aspects of the present disclosure are advantageous to provide one or more improved tire testing devices that are capable of performing the indoor test in various road surface conditions.

According to aspects of the present disclosure, there is further provided a tire testing device including a carriage configured to rotatably hold a test wheel provided with a test tire and being capable of travelling on a base along a road surface in a state where the test wheel is made to contact the road surface, and a driving system configured to drive the test wheel and the carriage. The driving system includes a carriage driving part configured to drive the carriage with respect to the road surface in a predetermined speed, a test wheel driving part configured to drive the test wheel in a rotating speed corresponding to the predetermined speed, a driving part configured to generate power to be used to drive the carriage and the test wheel, and a power distributing part configured to distribute power generated by the driving part to the carriage driving part and the test wheel driving part.

According to aspects of the present disclosure, there is further provided a tire testing device including a carriage configured to rotatably hold a test wheel provided with a test tire and being capable of travelling on a base along a road surface in a state where the test wheel is made to contact the road surface, and a driving system configured to drive the test wheel and the carriage. The driving system includes a driving part configured to generate power to be used to drive the carriage and the test wheel, and a first winding transmission mechanism configured to transmit the power generated by the driving part. The first winding transmission mechanism includes a drive pulley coupled to an output shaft of the driving part, a driven pulley held by the carriage and coupled to the test wheel, and a first winding intermediate node wound around the drive pulley and the driven pulley. The first winding intermediate node has a first portion and a second portion stretched in a travelling direction of the carriage and configured to be driven in directions opposite to each other, passes over the driven pulley at the first portion, and is fixed to the carriage at the second portion.

According to aspects of the present disclosure, there is further provided a tire testing device including a carriage configured to rotatably hold a test wheel provided with a test tire and being capable of travelling on a base along a road surface in a state where the test wheel is made to contact the road surface, and a driving system configured to drive the test wheel and the carriage. The driving system includes a test wheel driving part configured to drive the test wheel. The test wheel driving part includes a rotational motion supplying part configured to supply rotational motion of a rotating speed corresponding to a speed of the carriage, and a torque applying part configured to apply a predetermined torque to the test wheel by changing a phase of the rotational motion supplied from the rotational motion supplying part.

According to aspects of the present disclosure, there is further provided a tire testing device including a carriage configured to rotatably hold a test wheel provided with a test tire and being capable of travelling on a base along a road surface in a state where the test wheel is made to contact the road surface, and a driving system configured to drive the test wheel and the carriage. The driving system includes a test wheel driving part configured to drive the test wheel. The test wheel driving part includes two driving parts configured to generate power for rotationally driving the test wheel, and a power coupling part configured to couple power generated by the two driving parts. The two driving parts include a first driving part mounted on the base, and a second driving part mounted on the carriage.

BRIEF DESCRIPTION OF THE ACCOMPANYING DRAWINGS

FIG. 10 is a block diagram showing a schematic configuration of a control system.

FIGS. 26A-C show display examples of load profiles in the third variation.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, illustrative embodiments of the present disclosure will be described with reference to the drawings. In the following description, the same or corresponding numerals are assigned to the same or corresponding components, and redundant descriptions are herein omitted.

Figure 1:
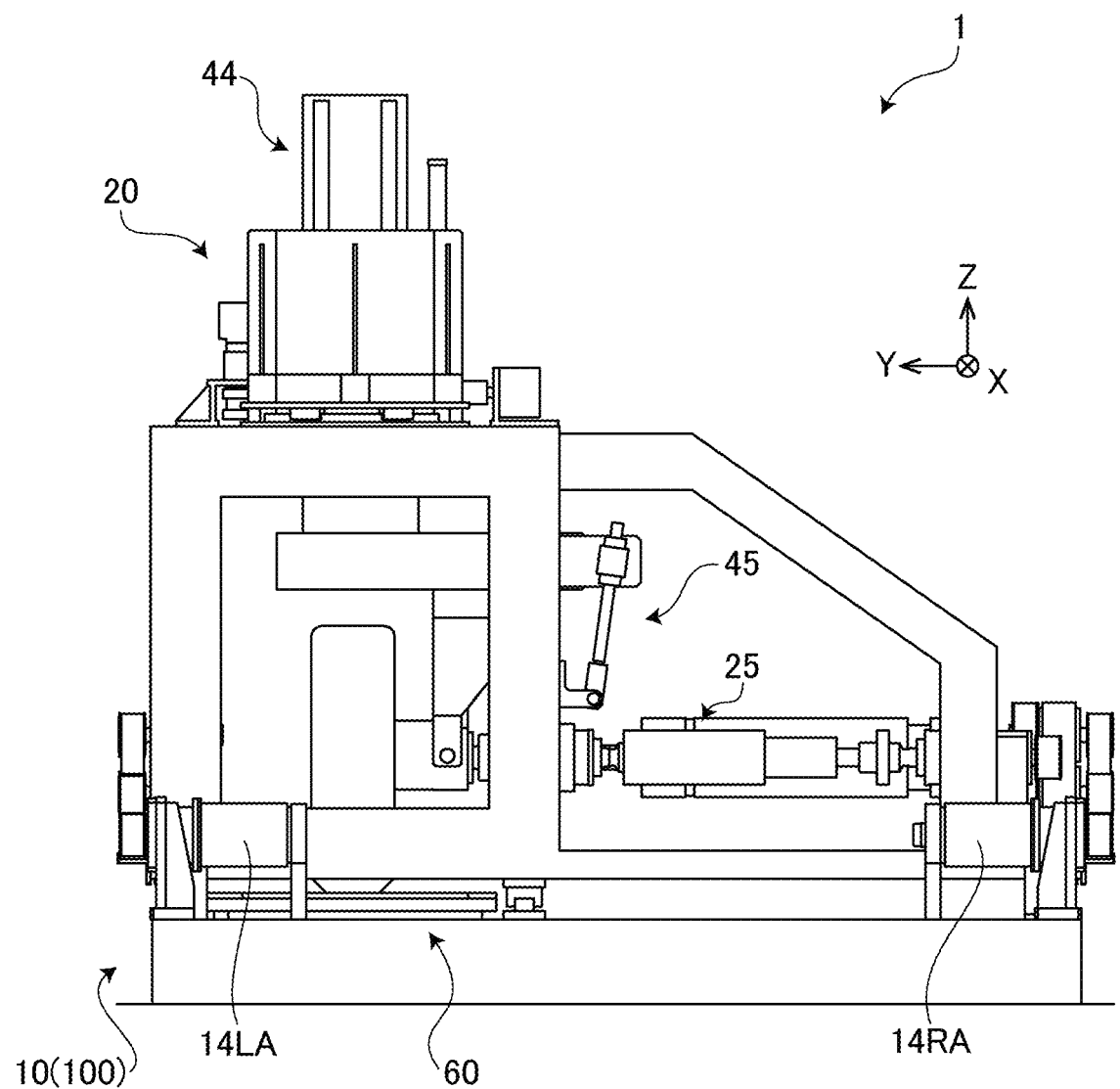
FIG. 1 is a front view of a tire testing device according to an illustrative embodiment of the present disclosure.
Figure 2:
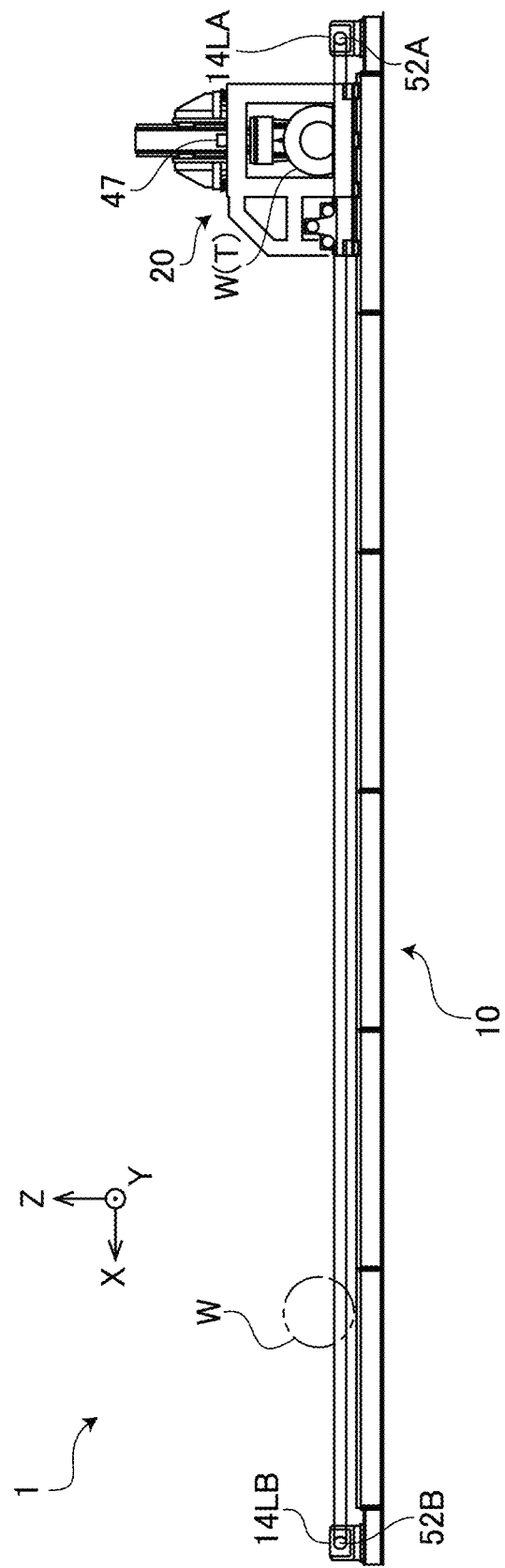
FIG. 2 is a left side view of the tire testing device according to the illustrative embodiment of the present disclosure.
Figure 3:
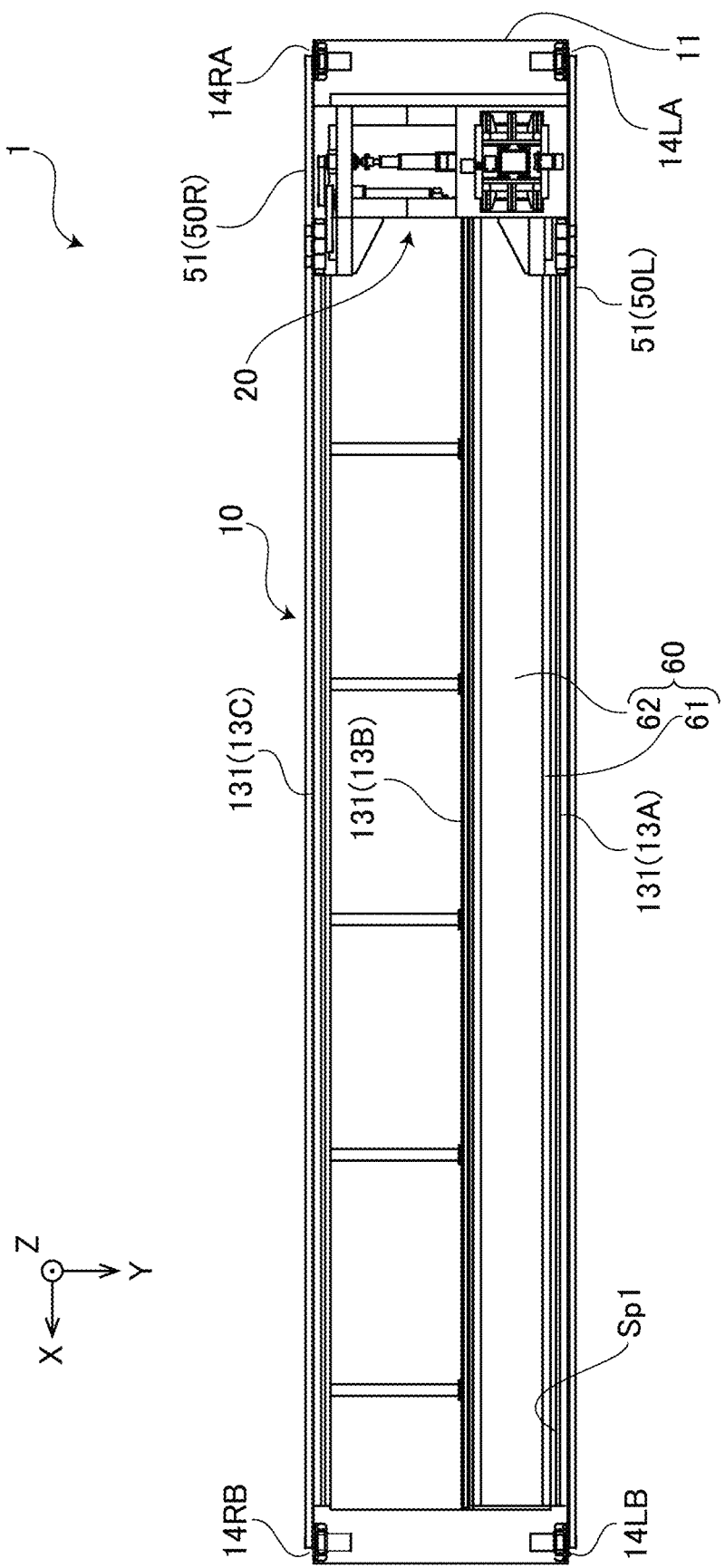
FIG. 3 is a plan view of the tire testing device according to the illustrative embodiment of the present disclosure.
Figure 4:
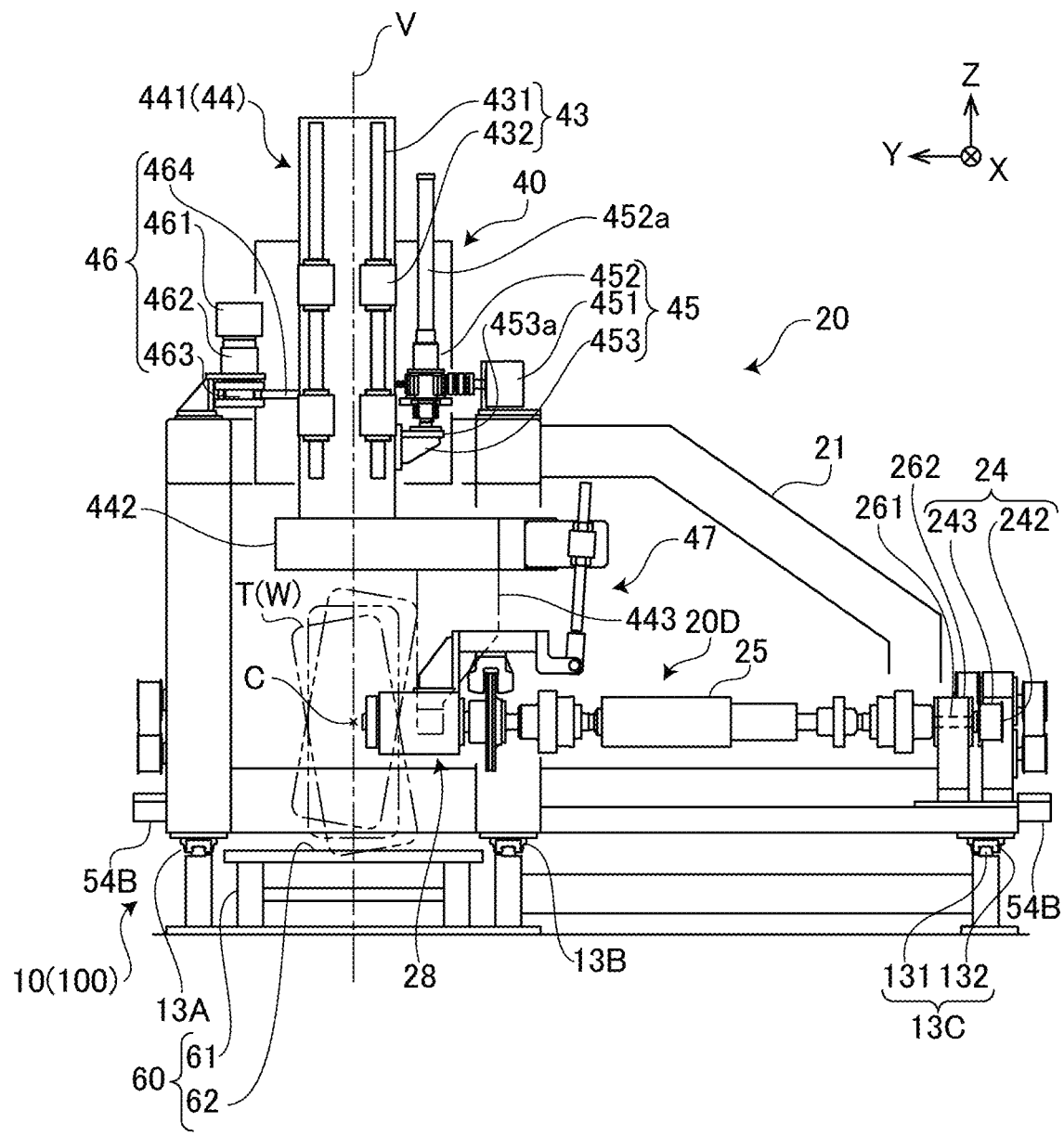
FIG. 4 is a diagram showing structures of and around a carriage.
Figure 5:
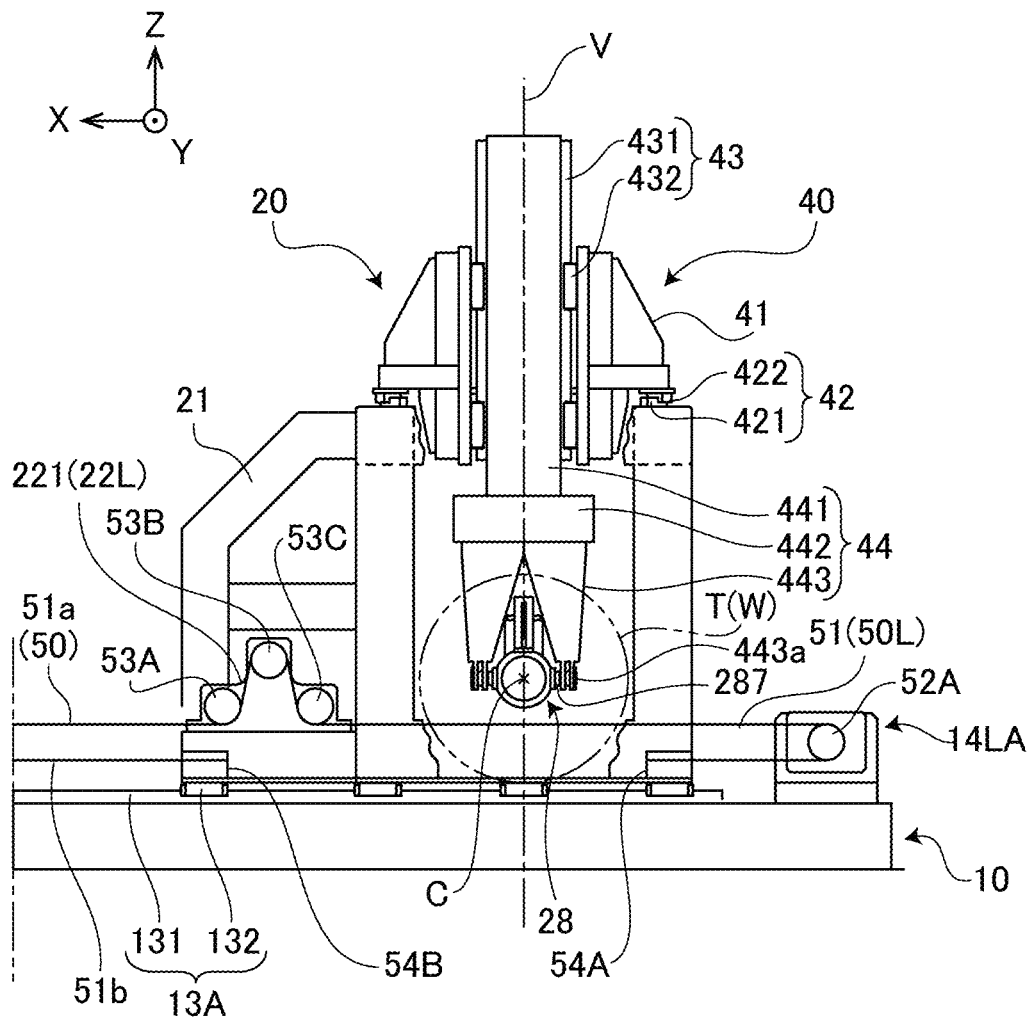
FIG. 5 is a diagram showing structures of and around the carriage.
Figure 6:
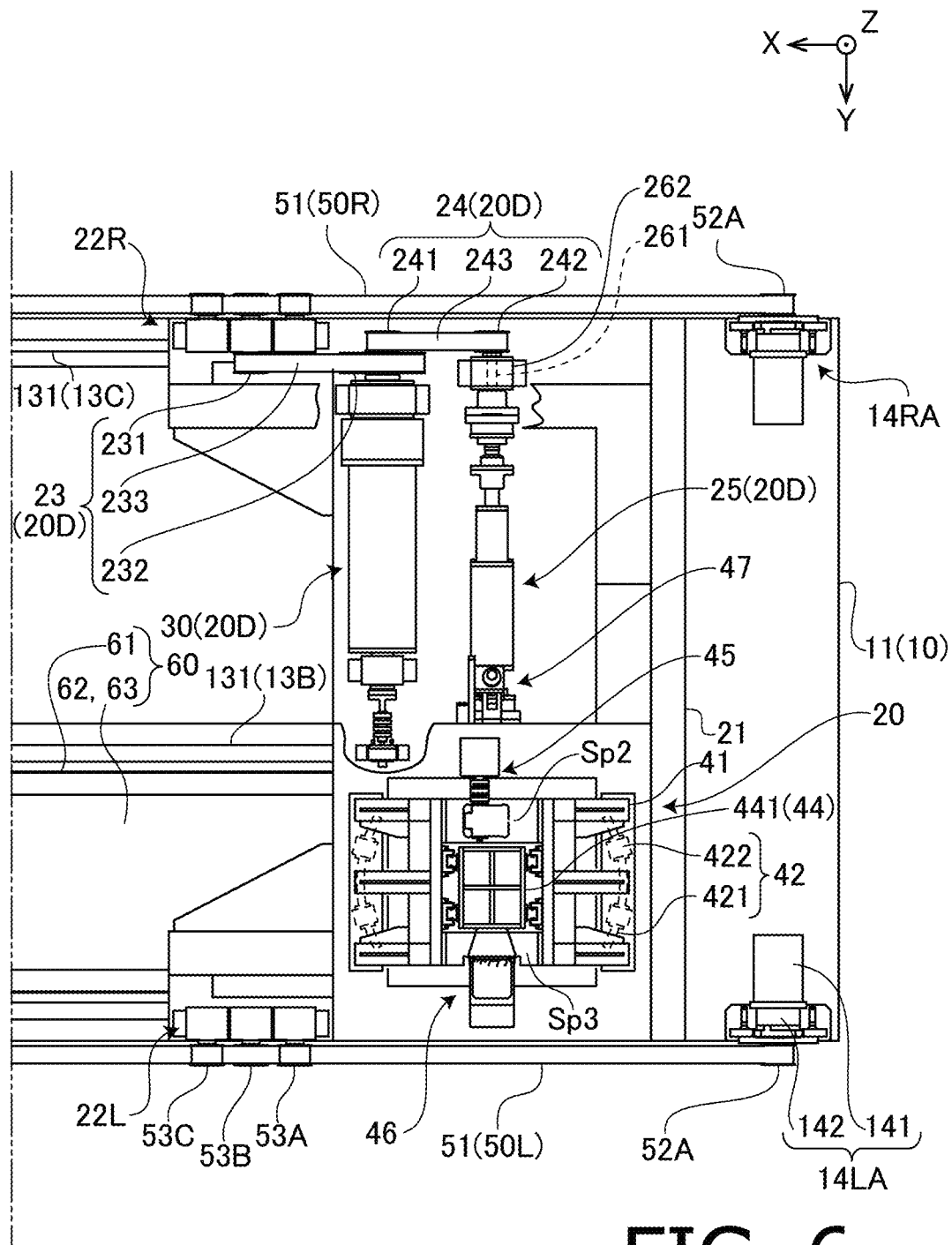
FIG. 6 is a diagram showing structures of and around the carriage.

FIGS. 1, 2 and 3 are a front view, a left side view and a plan view of a tire testing device 1 according to an illustrative embodiment of the present disclosure, respectively. FIGS. 4, 5 and 6 are a front view, a left side view and a plan view showing structures of and around a carriage 20 which will be described later, respectively. In FIGS. 4 to 6, for convenience of explanation, some components are omitted or shown in cross-sections.

In FIGS. 2 and 5, a direction from the right to the left is defined as an X axis direction, a direction perpendicular to the paper from the back side to the front side is defined as a Y axis direction, and a direction from the bottom to the top is defined as a Z axis direction. The X axis direction and the Y axis direction are horizontal directions orthogonal to each other, and the Z axis direction is a vertical direction. Also, a front-rear direction, an up-down direction and a left-right direction are defined as directions when facing a travelling direction of a carriage 20 (X axis positive direction). That is, an X axis positive direction is defined as front, an X axis negative direction is defined as rear, a Y axis positive direction is defined as left, a Y axis negative direction is defined as right, a Z axis positive direction is defined as up, and a Z axis negative direction is defined as down.

The tire testing device 1 includes a track part 10 and a road surface part 60 elongated in the X axis direction, and a carriage 20 that is capable of travelling on the track part 10 in the X axis direction. As shown in FIG. 3, to a left portion of the track part 10, an elongated space Sp1 extending over substantially the entire length of the track part 10 in the X axis direction is provided. The road surface part 60 is accommodated in this space Sp1. On an upper surface of the road surface part 60, a road surface 63a (a paved part 63) with which a test tire T mounted to the carriage 20 contacts is provided. In the present embodiment, in order to make it possible to replace the road surface part 60 in accordance with test conditions, the track part 10 and the road surface part 60 are separated from each other. It should be noted that a base frame 11 (hereinafter abbreviated to a "base 11") of the track part 10 and a frame 61 of the road surface part 60 may be integrally formed.

To the carriage 20, a test wheel W (a wheel rim to which the test tire T is mounted) is attached. When performing the test, the carriage 20 travels in a state where the test wheel W is in contact with the road surface 63a, and the test tire T rolls on the road surface 63a.

The track part 10 includes a plurality of (in the present embodiment, three) linear guideways (hereinafter abbreviated to "linear guides") 13 configured to guide movement of the carriage 20 in the X axis direction, and one or more drive parts 14 configured to generate mechanical power for driving the carriage 20. In the present embodiment, two pairs of the drive parts 14 (a pair of drive parts 14LA and 14LB on the left and a pair of drive parts 14RA and 14RB on the right) are mounted on the base 11 of the track part 10 near four corners of the base 11. The drive parts 14LA and 14RA are arranged at a rear end portion of the track part 10, and the drive parts 14LB and 14RB are arranged at a front end portion of the track part 10.

As shown in FIG. 6, each drive part 14 includes a servo motor 141, and an optional reducer 142 configured to reduce rotating speed of output from the servo motor 141. The drive parts 14RA and 14RB on the right serve both as a carriage driving part for driving the carriage 20 to travel and as a rotational motion supplying part for supplying, to the test wheel W, rotational motion of rotating speed corresponding to a travelling speed of the carriage. The drive parts 14LA and 14LB on the left serve as carriage driving part.

In the present embodiment, as the servomotor 141, a super-low inertia and high-power type AC servo motor with an inertia moment of a rotating part being equal to or less than $0.01$ kg·m$^2$ (preferably equal to or less than $0.008$ kg·m$^2$) and with a rated power of 3 to 60 kW (7 to 37 kW being more suitable for practical use) is used.

The tire testing device 1 includes a pair of belt mechanisms 50 (50L, 50R) on each of the left side and the right side. The belt mechanisms 50 transmit power generated by the drive parts 14 to the carriage 20 and drives the carriage 20 in the X axis direction. Each belt mechanism 50 includes a toothed belt 51, a pair of drive pulleys 52 (52A, 52B), and three driven pulleys 53 (53A, 53B, 53C). The drive pulleys 52 and the driven pulleys 53 are toothed pulleys that engage with the toothed belt 51.

The toothed belt 51 has core wires made of steel wires. It should be noted that a toothed belt having core wires made of so-called super fiber such as carbon fiber, aramid fiber or ultra-high molecular weight polyethylene fiber may be used as the toothed belt 51. By the use of light-weight and high-strength core wires such as carbon core wires, it becomes possible to drive the carriage 20 at high acceleration (or to apply high driving/braking force to the test wheel W) using a motor of relatively low output power, and thus it becomes possible to downsize the tire testing device 1 (or to make capacity of the tire testing device 1 large).

The belt mechanism 50R on the right serves both as a carriage driving part for driving the carriage 20 to travel and as a primary power transmitting part for transmitting power supplied from the rotational motion supplying part (drive parts 14RA, 14RB) to a secondary power transmitting part which will be described later. The belt mechanism 50L on the left serves as a carriage driving part.

In the following description, as for components that are provided as a pair on the left side and on the right side, as a general rule, the one on the left side will be described, and the one on the right side will be written together in bracket to omit redundant description.

The toothed belt 51 of the belt mechanism 50L [50R] on the left [right] is wound around the pair of drive pulleys 52 (52A, 52B) and the three driven pulleys 53 (53A, 53B, 53C). The pair of drive pulleys 52A, 52B are respectively coupled to output shafts of the pair of drive parts 14LA, 14LB [14RA, 14RB] on the left [right]. The three driven pulleys 53A, 53B, 53C are attached to a driven part 22L [22R] on the left [right] which will be described later.

As shown in FIG. 5, both ends of each toothed belt 51 are fixed to a main frame 21 of the carriage 20 with respective belt clamps 54 (54A, 54B), thereby each toothed belt 51 forming a loop via the carriage 20. The pair of drive pulleys 52A, 52B (FIG. 2) of the belt mechanism 50 are fixed pulleys that are arranged across an area through which the carriage 20 can travel and that are held on the base 11 (i.e., pulleys whose respective centers of gravity are fixed with respect to the base 11). The driven pulleys 53 (FIG. 5) are moving pulleys that are held on the carriage 20 and can move together with the carriage 20.

In the present embodiment, the pair of drive parts 14LA, 14LB [14RA, 14RB] are driven in the same phase. Effective diameters (i.e., pitch circle diameters) or numbers of teeth of the drive pulleys 52 and the driven pulleys 53 are the same. The drive parts 14LA, 14LB on the left and the drive parts 14RA, 14RB on the right are mounted with the left side and the right side reversed and are driven in opposite phases. As the toothed belt 51 is driven by the drive parts 14LA, 14LB [14RA, 14RB], the carriage 20 is pulled by the toothed belt 51 and is driven in the X axis direction.

The track part 10 includes a plurality of (in the present embodiment, three) linear guides 13 (13A, 13B, 13C). Each linear guide 13 includes a rail 131 extending in the X axis direction and forming a track, and one or more (in the present embodiment, three) carriages (hereinafter referred to as "runners 132") that can travel on the rail 131. Each rail 131 is laid on an upper surface of the base 11 of the track part 10. The rails 131 of the two linear guides 13A, 13B are arranged along both ends of the space Sp1 in the left-right direction and the rail 131 of the remaining linear guide 13C is arranged along a right end of the base 11, and the three rails 131 are attached to the base 11. Each runner 132 is attached on a lower surface of the carriage 20.

As shown in FIG. 6, the carriage 20 includes the main frame 21, driven parts 22L, 22R configured to respectively hold the driven pulleys 53 of the belt mechanisms 50L, 50R, a spindle part 28 (FIG. 4) configured to rotatably hold the test wheel W to which the test tire T is mounted, an alignment part 40 configured to be capable of adjusting alignment of the test wheel W with respect to the road surface 63a and load on the road surface 63a, and a spindle driving mechanism 20D configured to rotationally drive a spindle 280 of the spindle part 28. The spindle 280 is an axle to which the test wheel W is to be mounted.

Figure 7:
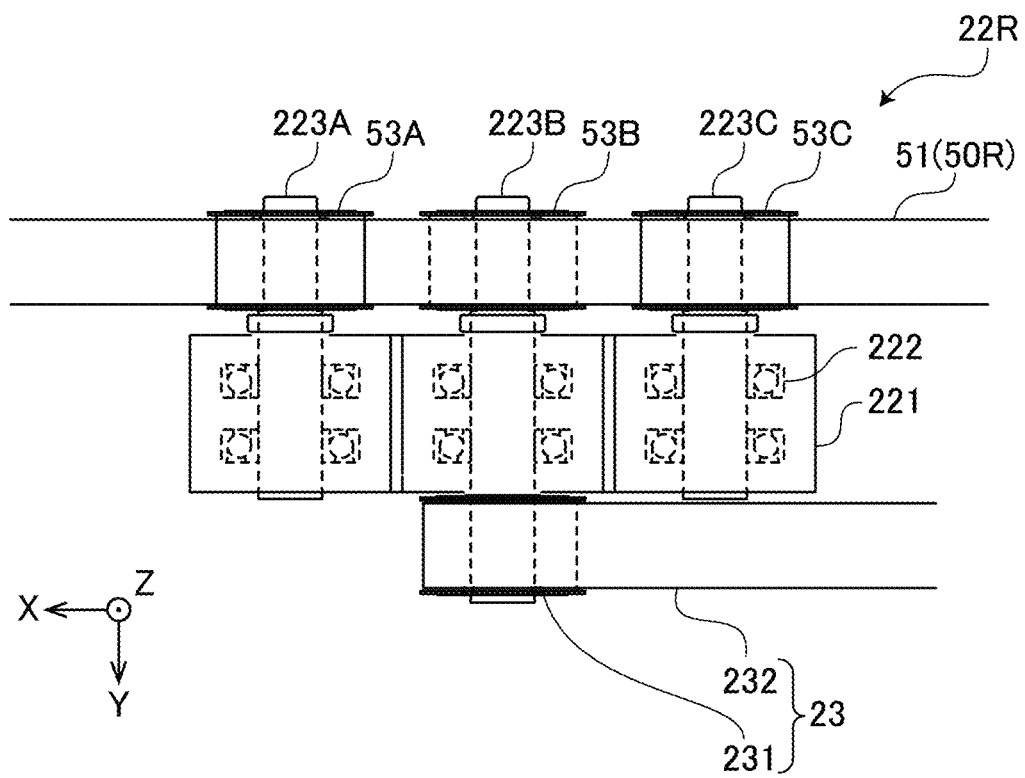
FIG. 7 is a cross-sectional view of a driven part.

FIG. 7 is a cross-sectional view showing an outline of a structure of the driven part 22R on the right. The driven part 22R includes a frame 221, three sets of bearings 222, and three shafts 223A-C. Three through holes extending in the Y axis direction are formed to the frame 221, and each of the shafts 223A-C is rotatably supported by a set of the bearings 222 fitted in respective through holes. In the present embodiment, each of the shafts 223A-C is supported by a pair of the bearings 222, but each of the shafts 223A-C may be supported by one bearing 222 or three or more bearings 222. To end portions of the shafts 223A-C protruding from one face of the frame 221, driven pulleys 53A-C of the belt mechanism 50R are respectively attached.

In the driven part 22R on the right, only the shaft 223B at the center in the X axis direction is longer than the other two (the shafts 223A, 223C), and the other end portion of the shaft 223B is protruding from the other face of the frame 221. To the other end portion of the shaft 223B, a drive pulley 231 of a belt mechanism 23 which will be described later is attached. That is, the belt mechanism 50R on the right and the belt mechanism 23 are coupled via the shaft 223B.

The driven part 22L on the left has a configuration similar to the above-described driven part 22R on the right, but differs from the driven part 22R on the right in that the driven part 22L is arranged with the left side and the right side reversed and in that all the three shafts 223A-C are short and the driven pulley 231 is not attached to the other end portion of the shaft 223B.

As shown in FIG. 6, the spindle driving mechanism 20D includes the belt mechanism 23, a torque applying device 30, a belt mechanism 24, and a slide type constant velocity joint 25. Power transmitted from the belt mechanism 50R on the right to the belt mechanism 23 through the shaft 223B (FIG. 7) of the driven part 22R on the right is transmitted to the spindle part 28 (FIG. 4) through the torque applying device 30, the belt mechanism 24 and the slide type constant velocity joint 25, and rotationally drives the test wheel W mounted to the spindle part 28. That is, a portion of the power generated by the drive parts 14RA, 14RB on the right is used to drive the carriage 20, and the other portion of the power is used to rotationally drive the test wheel W. That is, the belt mechanism 50R on the right serves as a part for driving the carriage 20 (the carriage driving part), as a part for driving the test wheel W (a test wheel driving part), and as a part for distributing the power generated by the drive parts 14RA, 14RB to the power for driving the carriage 20 and to the power for driving the test wheel W (a power distributing part).

An upper portion 51a and a lower portion 51b of the toothed belt 51 of the belt mechanism 50 are stretched in the travelling direction of the carriage 20 and are driven in directions opposite to each other. Specifically, the lower portion 51b of the toothed belt 51 which is fixed to the carriage 20 is driven in the travelling direction of the carriage along with the carriage 20, and the upper portion 51a is driven in a direction opposite to the travelling direction of the carriage 20 and the lower portion 51b. The upper portion 51a of the toothed belt 51 configured to travel in the direction opposite to the travelling direction of the carriage 20 is wound around the driven pulleys 53 attached to the carriage 20, and the driven pulleys 53 are driven by the upper portion 51a. The power applied to the driven pulley 53B is transmitted to the test wheel W through the secondary power transmitting part consisting of the belt mechanism 23, the torque applying device 30, the belt mechanism 24, the slide type constant velocity joint 25 and the spindle part 28, and is used to drive the test wheel W. By such configuration of the belt mechanism 50, it is made possible to drive both the carriage 20 and the test wheel W with the toothed belt 51.

In the present embodiment, the configuration in which the carriage 20 and the test wheel W are driven by using rotational motion that is transmitted by a common power transmitting device (i.e., the belt mechanism 50R) is adopted. By this configuration, it is made possible to rotationally drive the test wheel W in a peripheral speed (a rotating speed) corresponding to a travelling speed of the carriage 20 at all times regardless of the travelling speed of the carriage 20. Also, in order to reduce working amount (i.e., power consumption) of the torque applying device 30, the present embodiment is configured such that the test wheel W is rotationally driven in the peripheral speed that is substantially the same as the travelling speed of the carriage 20 when the torque applying device 30 is not active.

Figure 8:
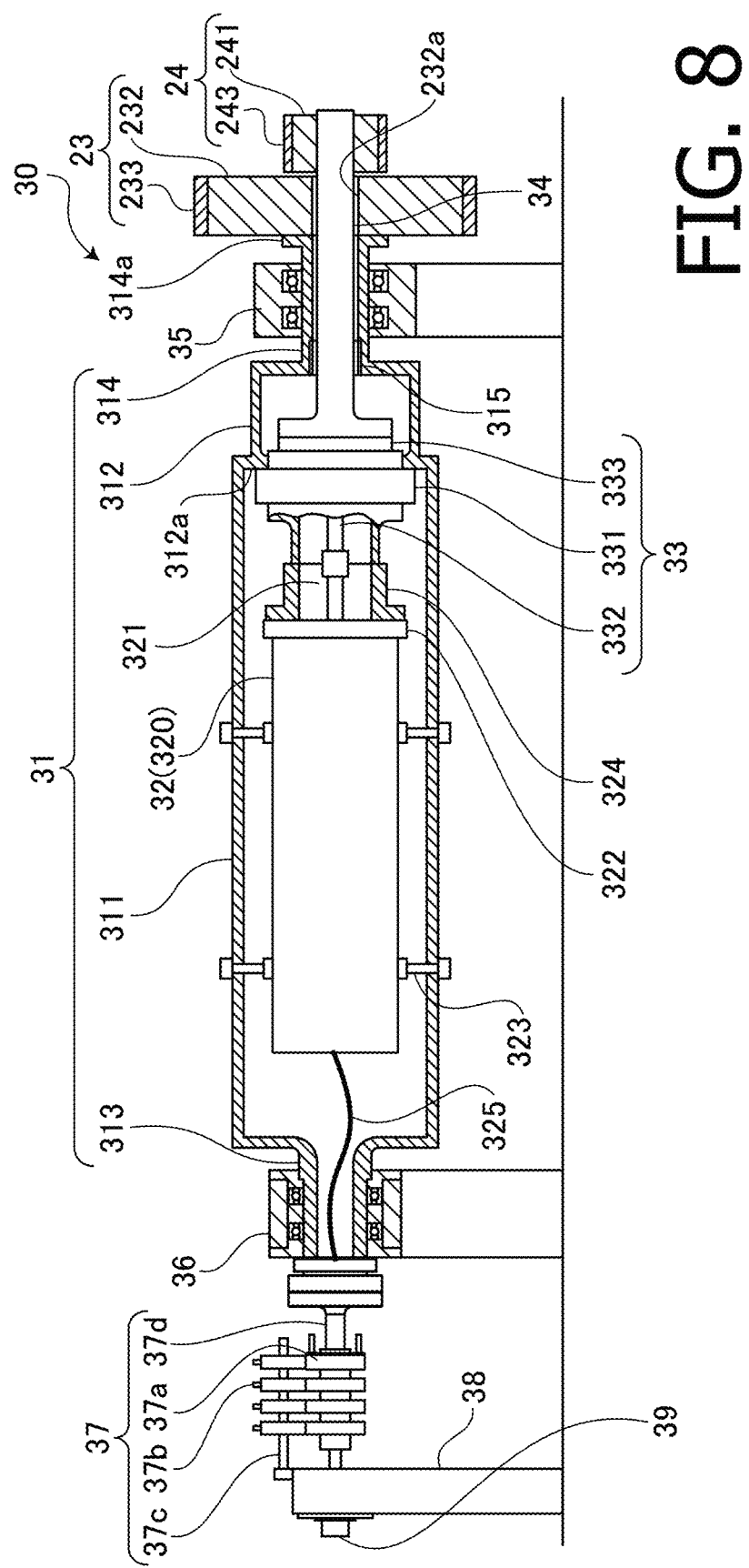
FIG. 8 is a side cross-sectional view of a torque generating device.

FIG. 8 is a side cross-sectional view of the torque applying device 30. The torque applying device 30 generates torque to be applied to the test wheel W and outputs the torque by superposing on the rotational motion transmitted by the belt mechanism 23. In other words, the torque applying device 30 can apply the torque to the test wheel W (i.e., the torque applying device 30 can apply driving force or braking force between the road surface 63a and the test wheel W) by changing phase of the rotational motion transmitted by the belt mechanism 23.

By incorporating the torque applying device 30 in the spindle driving mechanism 20D, it becomes possible to divide roles between a power source (the drive parts 14RA, 14RB) for controlling the rotating speed and a power source (a servo motor 32 which will be described later) for controlling the torque. Due to this configuration, it becomes possible to use a power source of a smaller capacity and to control the rotating speed and the torque to be applied to the test wheel W with higher accuracy. Also, since torque that acts on the belt mechanism 50L decreases by incorporating the torque applying device 30 in the carriage 20, it becomes possible to downsize the belt mechanism 50L (e.g., decrease a number of toothed belts used) and to use members of lower load capacities.

The torque applying device 30 includes a housing 31; a servo motor 32, a reducer 33 and a shaft 34 that are mounted inside the housing 31; two bearing parts 35, 36 configured to rotatably support the housing 31; a slip ring part 37; a columnar support 38 configured to support the slip ring part 37; and a rotary encoder 39. A rotating speed of the housing 31 is detected by the rotary encoder 39.

In the present embodiment, as the servo motor 32, a super-low inertia and high-power type AC servo motor with an inertia moment of a rotating part being equal to or less than 0.01 kg·m$^2$ and with a rated power of 7 to 37 kW is used.

The housing 31 has a motor accommodating part 311 and a cap part 312 being substantially cylindrical and of large diameters, and a pair of shaft parts 313, 314 being substantially cylindrical and of diameters smaller than the motor accommodating part 311. To an end (a left end in FIG. 8) of the motor accommodating part 311, the shaft part 313 is coaxially coupled (i.e., coupled in a manner such that the motor accommodating part 311 and the shaft part 313 share a center line). To the other end (a right end in FIG. 8) of the motor accommodating part 311, the shaft part 314 is coaxially coupled via the cap part 312. The shaft part 313 is rotatably supported by the bearing part 36, and the shaft part 314 is rotatably supported by the bearing part 35.

A flange 314a is formed at a tip of the shaft part 314, and a driven pulley 232 of the belt mechanism 23 is coaxially coupled to the flange 314a. A toothed belt 233 of the belt mechanism 23 is wound around the driven pulley 232 and the drive pulley 231 (FIG. 7). The housing 31 is rotationally driven by the belt mechanism 23.

A bearing 315 is provided on an inner periphery of the shaft part 314. The shaft 34 is inserted in a hollow portion of the shaft part 314 and is rotatably supported by the bearing 315. The shaft 34 penetrates through the shaft part 314 and the driven pulley 232 and an end portion of the shaft 34 protrudes to the inside of the cap part 312. A drive pulley 241 of the belt mechanism 24 is coaxially coupled to the other end portion of the shaft 34 which penetrated through a hole 232a of the driven pulley 232. A toothed belt 243 is wound around the drive pulley 241.

The servo motor 32 is accommodated in a hollow portion of the motor accommodating part 311. A shaft 321 of the servo motor 32 is arranged coaxially with the motor accommodating part 311, and a motor case 320 (i.e., a stator) of the servo motor 32 is fixed to the motor accommodating part 311 with a plurality of stud bolts 323. A flange 322 of the servo motor 32 is coupled to a gear case 331 of the reducer 33 via a coupling tube 324. The gear case 331 of the reducer 33 is fixed to an inner flange 312a of the cap part 312.

The shaft 321 of the servo motor 32 is connected to an input shaft 332 of the reducer 33. The shaft 34 is connected to an output shaft 333 of the reducer 33. Torque that is output by the servo motor 32 is amplified by the reducer 33 and is transmitted to the shaft 34. Rotation output from the shaft 34 to the belt mechanism 24 is a superposition of the rotation of the housing 31 driven by the belt mechanism 23 and the torque generated by the servo motor 32 and the reducer 33. That is, the shaft part 314 of the housing 31 is an input shaft of the torque applying device 30, and the shaft 34 is an output shaft of the torque applying device 30. The torque applying device 30 outputs the torque generated by the torque applying device 30 through the output shaft by superposing the torque on the rotational motion transmitted to the input shaft.

The slip ring part 37 includes a plurality of pairs of a slip ring 37a and a brush 37b, a supporting frame 37c and a coupling tube 37d. The plurality of slip rings 37a are arranged apart from each other and are fitted on an outer periphery of the coupling tube 37d.

The coupling tube 37d is coaxially coupled to the shaft part 313 of the housing 31. The brushes 37b contacting outer peripheries of the corresponding slip rings 37a are supported by the supporting frame 37c attached to the columnar support 38. A cable 325 of the servo motor 32 passes through the hollow portion of the shaft part 313 and is connected to the slip rings 37a. The brushes 37b are connected to a servo amplifier 32a (FIG. 10). That is, the servo motor 32 and the servo amplifier 32a are connected to each other via the slip ring part 37.

As shown in FIGS. 4 and 6, the driven pulley 242 around which the toothed belt 243 of the belt mechanism 24 is wound is coaxially coupled to an end of a shaft 261 rotatably supported by the bearing part 262. The other end of the shaft 261 is connected to an end of the slide type constant velocity joint 25. The other end of the slide type constant velocity joint 25 is coupled to the spindle 280 via a shaft 263 and the like. The slide type constant velocity joint 25 is configured to be capable of transmitting rotation smoothly without rotation fluctuation regardless of an operating angle (an angle between the input shaft and the output shaft). The slide type constant velocity joint 25 is variable in length.

The spindle 280 is supported by the alignment part 40 such that its angle and position of the input shaft is variable. By coupling the spindle 280 and the shaft 261 held by the bearing part 262 via the slide type constant velocity joint 25, even if the angle and/or position of the spindle 280 change, the slide type constant velocity joint 25 flexibly conforms to the change. Therefore, large strain does not occur to the spindle 280 and the shafts 261, 263 and thus rotation is smoothly transmitted to the spindle 280 without change in speed.

As shown in FIG. 5, the alignment part 40 includes a pair of pivoting frames 41, a pair of curved guideways 42 (hereinafter abbreviated to "curved guides"), a slide frame 44, and two pairs of linear guides 43.

Each pivoting frame 41 is placed on the main frame 21 of the carriage 20 via the curved guide 42. The curved guide 42 includes an arc-like rail 421 attached on an upper surface of the main frame 21, and a plurality of (in the present embodiment, two) carriages 422 (hereinafter referred to as "runners 422") that can travel on the rail 421. The runners 422 are attached on a bottom surface of the pivoting frame 41. The pair of curved guides 42 and the pair of pivoting frames 41 are respectively arranged to oppose to each other in the front-rear direction across a vertical line V passing through a center C of the test wheel W. A center of curvature of each curved guide 42 is on the vertical line V. That is, each pivoting frame 41 is supported by the curved guide 42 to be pivotable about the vertical line V.

As shown in FIG. 4, the slide frame 44 has a column part 441, a coupling part 442, and a fork 443 in this order from the top. The column part 441 (i.e., an upper portion of the slide frame 44) is arranged vertically such that the center line thereof coincides with the vertical line V. The fork 443 (i.e., a lower portion of the slide frame 44) is set back rightward (in a direction of a rotation axis Ay) with respect to the vertical line V so as not to contact with the test wheel W. The coupling part 442 extends in the Y axis direction and couples a lower end portion of the column part 441 and an upper end portion of the fork 443 together. Therefore, the slide frame 44 is formed in a substantially crank shape when viewed in the X axis direction.

One pair of the linear guides is provided on each of a front face and a rear face of the column part 441 of the slide frame 44. Each linear guide includes a rail 431 oriented in the vertical direction and fixed to the side face of the column part 441, and a plurality of (in the present embodiment, two) carriages 432 (hereinafter referred to as "runners 432") that can travel on the rail 431. The runners 432 are attached on a side face of the pivoting frame 41.

As shown in FIG. 5, a lower portion of the fork 443 is branched in the front-rear direction. To lower end portions of the fork 443 branched into two, respective bearings 443a are provided to be coaxial with respect to each other.

Figure 9:
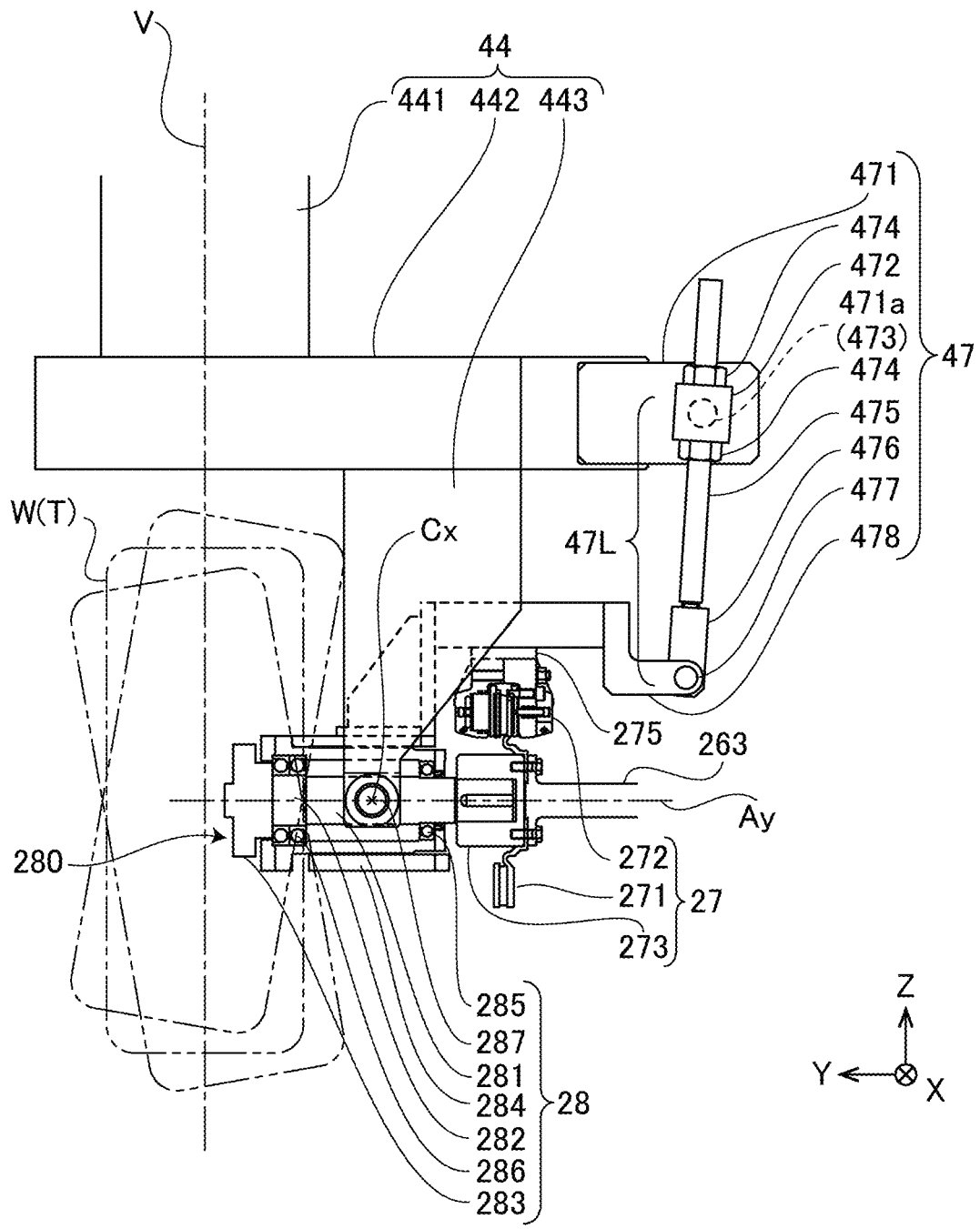
FIG. 9 is a diagram showing structures of and around a spindle.

FIG. 9 is a diagram showing structures of and around the spindle part 28. The spindle part 28 is arranged between a pair of the bearings 443a (FIG. 5) provided to the lower end portions of the fork 443 while orienting a central axis (the rotation axis Ay) of the spindle 280 in the left-right direction. The spindle part 28 is supported by the pair of bearings 443a to be rotatable about a rotation axis Cx extending in the front-rear direction. The directions of the rotation axis Ay of the spindle 280 and the rotation axis Cx of a spindle case 284 change in accordance with the alignment of the spindle 280 and thus do not necessarily coincide with the Y axis direction and the X axis direction, respectively.

The spindle part 28 includes the spindle 280, and the spindle case 284 configured to rotatably support the spindle 280. The spindle 280 includes a body part 281, a six force components sensor 282, and a hub 283. The body part 281 is a cylindrical shaft. The six force components sensor 282 is a substantially cylindrical member that is coaxially attached to a tip of the body part 281 and is a piezoelectric force sensor that is capable of detecting six force components (forces in the three axial directions orthogonal to each other and torques around respective axes). The hub 283 is a member for attaching the test wheel W and is coaxially attached to a tip of the six force components sensor 282. The body part 281, the six force components sensor 282 and the hub 283 are coupled integrally to form the spindle 280. The spindle 280 is an axle to which the test wheel W is to be mounted and that rotates integrally with the test wheel W. Since the test wheel W is integrally attached to the six force components sensor 282 via the hub 283, six force components acting on the test wheel W are detected by the six force components sensor 282.

The spindle case 284 is a substantially cylindrical member configured to accommodate and rotatably hold the spindle 280. On an inner periphery of the spindle case 284, a bearing 285 and a pair of bearings 286 are attached. The spindle 280 is rotatably supported by the bearing 285 and the bearings 286.

On side faces of the spindle case 284 on the front and the rear, a pair of pivots 287 which respectively rotatably fit to the pair of bearings 443a (FIG. 5) of the fork 443 are attached. That is, the spindle part 28 is supported by the pair of bearings 443a to be rotatable about the rotation axis Cx.

As shown in FIG. 4, the alignment part 40 includes a load adjusting part 45, a slip angle adjusting part 46, and a camber adjusting part 47. The load adjusting part 45 is a unit configured to adjust load acting on the test wheel. The slip angle adjusting part 46 is a unit configured to adjust a slip angle of the test wheel W by causing the alignment part 40 (more specifically, the pivoting frame 41) to rotate about the vertical line V. The camber adjusting part 47 is a unit configured to adjust a camber angle of the test wheel W by causing the spindle part 28 to rotate about the rotation axis Cx (FIG. 9).

The load adjusting part 45 includes a servo motor 451, a motion converter 452, and a bracket 453. The above-described linear guide 43 may also be included in the load adjusting part 45. The servo motor 451 is attached to the main frame 21 of the carriage 20. The motion converter 452 is a device configured to convert rotational motion of the servo motor 451 into vertical linear motion of a vertically erected movable element 452a. As the motion converter 452, for example, a rack-and-pinion mechanism, a mechanism in which an intersecting shaft such as a bevel gear and a feed screw are combined, or a mechanism in which a skewed shaft such as a worm gear or a screw gear and a feed screw are combined is used. The bracket 453 is arranged right below the movable element 452a of the motion converter 452, and is attached to a side face of the column part 441 of the slide frame 44 while facing a flange 453a up.

As the movable element 452a of the motion converter 452 is caused to descend by driving the servo motor 451, a lower end of the movable element 452a abuts the flange 453a of the bracket 453. As the servo motor 451 is further driven, the slide frame 44 is pressed vertically downward by the movable element 452a via the bracket 453. The test wheel W held by the alignment part 40 is thereby pressed against the road surface 63a, and load depending on a height (i.e., a position in the Z axis direction) of the movable element 452a acts between the test tire T and the road surface 63a. The load that acts on the test wheel W is detected by the six force components sensor 282 (FIG. 9) of the spindle part 28. The driving of the servo motor 451 is controlled such that the detected load coincides with a set load value.

As shown in FIG. 6, a portion of the load adjusting part 45 is arranged in a space Sp2 surrounded by the pair of pivoting frames 41 and the column part 441 of the slide frame 44. By this configuration, space is efficiently used and downsizing of the carriage is realized.

The slip angle adjusting part 46 includes a servo motor 461 attached to the main frame 21 of the carriage 20, a reducer 462, a drive gear 463 coupled to an output shaft of the reducer 462, and a driven gear 464 that engages with the drive gear 463. As the drive gear 463, for example, a spur gear or a sector gear is used. The driven gear 464 is a sector gear. As the gear mechanism (the drive gear 463 and the driven gear 464) of the slip angle adjusting part 46, a worm gear, a bevel gear, a screw gear and the like may be used. The servo motor 461, the reducer 462 and the drive gear 463 are attached to the main frame 21 of the carriage 20. The driven gear 464 is attached to the side face of the column part 441 of the slide frame 44 such that a rotation axis of the driven gear 464 coincides with the vertical line V.

Rotation of the servo motor 461 is reduced by the reducer 462 and is transmitted to the driven gear 464 via the drive gear 463. The driven gear 464 and the slide frame 44 thereby rotates about the vertical line V. As a result, the test wheel W supported by the slide frame 44 via the spindle part 28 also rotates about the vertical line V and the slip angle of the test wheel W changes.

As shown in FIG. 6, a portion of the slip angle adjusting part 46 is arranged in a space Sp3 surrounded by the pair of pivoting frames 41 and the column part 441 of the slide frame 44. By this configuration, space is efficiently used and downsizing of the carriage is realized. The space Sp2 in which the load adjusting part 45 is arranged and the space Sp3 in which the slip angle adjusting part 46 is arranged are spaces that are provided on opposite sides of the column part 441 in the left-right direction. By providing the load adjusting part 45 and the slip angle adjusting part 46 in different spaces, assembly and maintenance efficiencies improve.

As shown in FIG. 9, the camber adjusting part 47 includes an upper arm 471 attached to a right end of the coupling part 442, a joint 472 rotatably supported by the upper arm 471, a full thread bolt 475 (hereinafter referred to as a "stud 475") to which the joint 472 is attached, a rod end 476 attached to one end of the stud 475, and a lower arm 478 rotatably coupled to the rod end 476 with a pin 477. An end portion of the lower arm 478 is fixed to the spindle case 284. It should be noted that the upper arm 471 may be attached to the fork 443 of the slide frame 44.

The upper arm 471 is a flat plate extending in parallel with the rotation axis Ay (i.e., in a direction away from the vertical line V), and is arranged perpendicular to the rotation axis Cx of the spindle case 284. To a tip portion of the upper arm 471, a pivot 471a parallel to the rotation axis Cx is provided.

The joint 472 is a substantially cuboidal member to which a through hole for inserting the stud 475 is formed. To the joint 472, a bearing 473 that rotatably fits to the pivot 471a of the upper arm 471 is provided. That is, the joint 472 is supported to be rotatable about the pivot 471a parallel to the rotation axis Cx of the spindle case 284. The joint 472 is nipped between a pair of nuts 474 fitted to the stud 475 and is fixed to the stud 475.

A tip portion of the lower arm 478 is coupled to a lower end portion of the rod end 476 by the pin 477. The pin 477 that couples the rod end 476 and the lower arm 478 together is a pivot parallel to the rotation axis Cx of the spindle case 284 too. That is, the slide frame 44 and upper arm 471 (a first link), the stud 475 and rod end 476 (a second link), and the lower arm 478 and spindle case 284 (a third link) are circularly coupled together via three pivots parallel to the rotation axis Cx [the pivot 471a (a first joint), the pin 477 (a second joint) and the pivot 287 (a third joint)] to be rotatable about respective pivots, thereby forming a link mechanism.

A length of a variable-length link 47L connecting the two joints (the pivot 471a and the pin 477) changes as positions of the nuts 474 along the stud 475 change. At this time, the lower arm 478 and the spindle case 284 rotates about the pivot 287 (the rotation axis Cx) and inclination of the rotation axis Ay of the spindle 280 and the test wheel W with respect to the road surface 63a changes. Therefore, it is possible to adjust the camber by elongating and contracting the variable-length link 47L by changing the positions of the nuts 474 along the stud 475. The camber changes toward the minus side when the variable-length link 47L is elongated and changes toward the plus side when the variable-length link 47L is contracted.

The tire testing device 1 includes a braking system 27 (hereinafter abbreviated to a "brake 27") that can decelerate the rotation of the spindle 280. The brake 27 includes a disc rotor 271 attached to the spindle 280, a caliper 272 attached to the lower arm 478, and a hydraulic pressure supplying device 276 (FIG. 10) configured to supply hydraulic pressure to the caliper 272.

The spindle 280 is coupled to the slide type constant velocity joint 25 of the spindle driving mechanism 20D (FIG. 6) via an attachment 273, the disc rotor 271 and the shaft 263.

The lower arm 478 is formed in a crank shape whose middle portion is set back upward (i.e., in a direction away from the spindle 280). The caliper 272 of the brake 27 is attached to the middle portion of the lower arm 478 being away from the spindle 280 via an attachment 275.

The attachment 273 and the shaft 263 are replaceable small members that are manufactured in accordance with a shape of the disc rotor 271. The attachment 275 is a relatively easily replaceable and low-cost small part that is manufactured in accordance with a shape of the caliper 272. By using the attachments 273, 275 and the shaft 263, it becomes possible to change types of the brake 27 at lower cost since it becomes unnecessary to replace the spindle 280 and/or the slide type constant velocity joint 25 whose replacing costs are relatively high when changing the types of the brake 27 (the disc rotor 271 and the caliper 272).

FIG. 10 is a block diagram showing a schematic configuration of a control system 1a of the tire testing device 1. The control system 1a includes a control part 72 configured to control operation of the entire device, a measuring part 74 configured to perform various measurements, and an interface part 76 configured for input from and output to outside.

The control part 72 includes a CPU, a ROM, and/or a RAM. To the control part 72, the servomotors 141 of respective drive parts 14, the servo motor 32 of the torque applying device 30, the servo motor 451 of the load adjusting part 45 and the servo motor 461 of the slip angle adjusting part 46 are connected via servo amplifiers 141a, 32a, 451a and 461a, respectively.

Also, to the control part 72, the hydraulic pressure supplying device 276 of the brake 27 is connected. The hydraulic pressure supplying device 276 generates a predetermined hydraulic pressure based on a command from the control part 72 and supplies the hydraulic pressure to the caliper 272. The hydraulic pressure supplying device 276 includes a servo motor 276b, a motion converter 276c configured to convert rotational motion output by the servo motor 276b into linear motion, a brake master cylinder 276d configured to be driven by the linear motion output by the motion converter 276c, and a servo amplifier 276a configured to generate driving current to be supplied to the servo motor 276b based on a command from the control part 72.

The control part 72 and respective servo amplifiers 141a, 276a, 32a, 451a and 461a are communicably connected to each other with optical fibers and it is made possible to perform high-speed feedback control between the control part 72 and respective servo amplifiers. It is thereby made possible to perform synchronized control with high precision (with high resolution and high accuracy in the time axis).

To the measuring part 74, the six force components sensor 282 is connected via a pre-amplifier 282a. Signals from the six force components sensor 282 are amplified at the pre-amplifier 282a and are converted into digital signals at the measuring part 74 to generate measurement data. The measurement data is input to the control part 72. Pieces of phase information detected by built-in rotary encoders RE of respective servomotors 141, 276b, 32, 451 and 461 are input to the control part 72 via respective servo amplifiers 141a, 276a, 32a, 451a and 461a.

The interface part 76 includes, for example, one or more of a user interface for input by and output to a user, a network interface for connection to various types of network such as a LAN (Local Area Network), and various types of communication interfaces such as a USB (Universal Serial Bus) and a GPIB (General Purpose Interface Bus) for connection to external devices. The user interface includes, for example, one or more of various types of operation switches, indicators, various types of display devices such as an LCD (Liquid Crystal Display), various types of pointing devices such as a mouse and a touch panel, and various types of input/output devices such as a touch screen, a video camera, a printer, a scanner, a buzzer, a speaker, a microphone and a memory card reader/writer.

The control part 72 can cause the carriage 20 to travel in a predetermined speed by synchronously controlling driving of the servo motors 141 of respective drive parts 14 based on speed data that is input through the interface part 76. In the present embodiment, all the four drive parts 14 are driven in the same phase (To be exact, the drive parts 14LA, 14LB on the left and the drive parts 14RA, 14RB on the right are driven in opposite phases [in opposite rotating directions]).

The control part 72 can apply a predetermined longitudinal force to the test tire T by controlling driving of the servo motor 32 of the torque applying device 30 based on data of the longitudinal force (braking force or driving force) to be applied to the test tire T obtained through the interface part 76. The control part 72 can also apply a predetermined torque to the test wheel W by controlling the torque applying device 30 based on torque data (or acceleration data) in place of the longitudinal force data.

The control part 72 can execute the control of the drive part 14 for causing the carriage 20 to travel in a predetermined travelling speed (and, at the same time, causing the test tire T to rotate in a peripheral speed that is substantially the same as the travelling speed) and the control of the torque applying device 30 for applying the longitudinal force (or the torque) to the test tire T synchronously based on a synchronizing signal.

Aside from basic waveforms such as sine wave, half sine wave, sawtooth wave, triangle wave and trapezoid wave, longitudinal force (or torque) waveforms that are measured in on-road tests, longitudinal force (or torque) waveforms that are obtained through simulated calculations, or other arbitrary synthesized waveforms (e.g., waveforms that are generated by a function generator or the like) can be used as waveforms of the torque to be generated by the torque applying device 30.

Similarly, with regard to the control of the travelling speed of the carriage 20 (or the rotating speed of the test wheel W), aside from the basic waveforms, waveforms of rotating speeds of wheels that are measured in on-road tests, waveforms of change of speed that are obtained through simulated calculations, or other arbitrary synthesized waveforms (e.g., waveforms that are generated by a function generator or the like) can be used.

Figure 11:
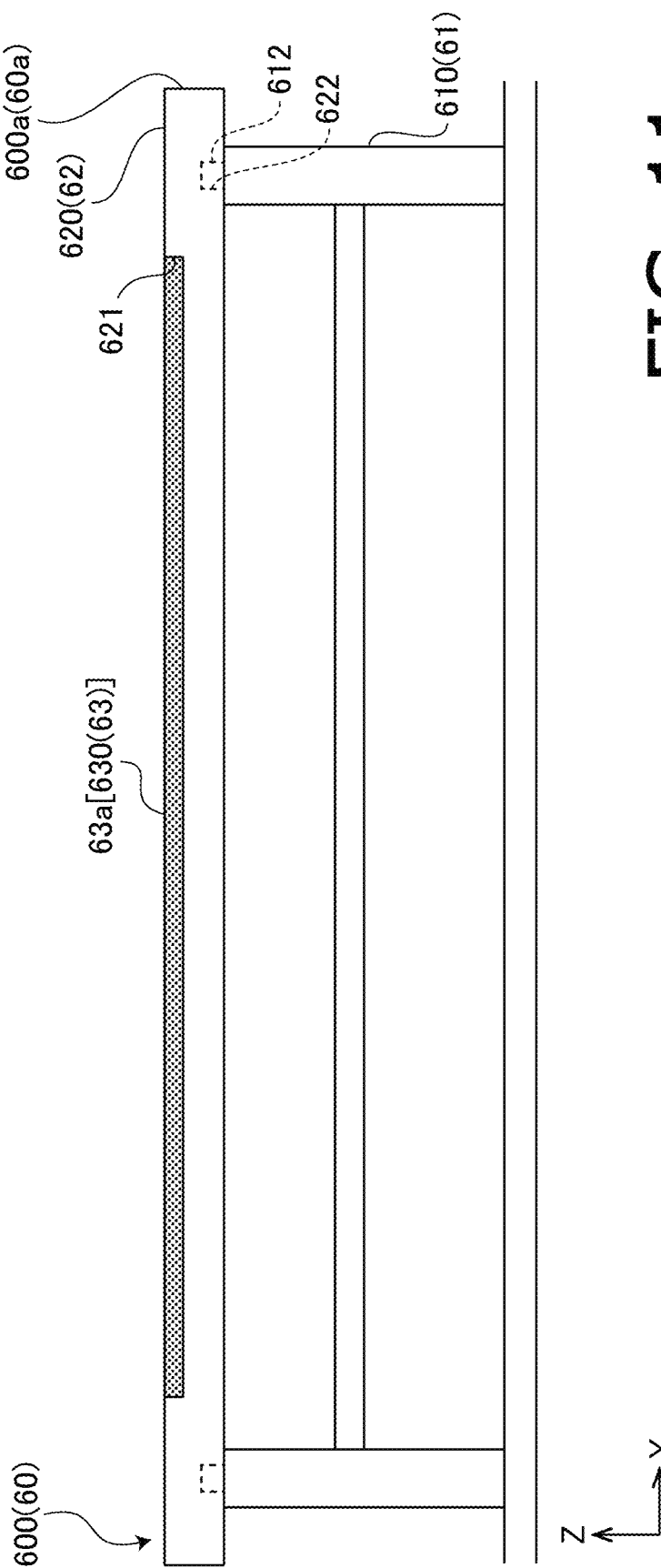
FIG. 11 is a transverse cross-sectional view of a road surface part.

FIG. 11 is a transverse cross-sectional view of the road surface part 60. The road surface part 60 includes the frame 61 and a main body part 60a supported by the frame 61. The main body part 60a includes a base 62 and a pavement part 63 held by the base 62. On an upper surface of the base 62, a recessed part 621 extending in an extending direction of the road surface part 60 (i.e., in the X axis direction being the travelling direction of the carriage 20) is formed. The pavement part 63 is for example formed by filling the recessed part 621 with simulated pavement material which will be described later and hardening the simulated pavement material. On an upper surface of the pavement part 63, the road surface 63a with which the test wheel W contacts is formed.

In the present embodiment, the main body part 60a is configured from main body part units 600a being road surface units (replaceable structures each including at least a portion of the road surface 63a) and is detachably attached on the frame 61. The road surface unit is not limited to a configuration in which the main body part 60a is unitized (hereinafter referred to as a "main body part unit") as in the present embodiment but may be formed to have a configuration in which only the pavement part 63 is unitized (hereinafter referred to as a "pavement part unit") or a configuration in which the entire road surface part 60 including the frame 61 is unitized (hereinafter referred to as a "road surface part unit").

The main body part 60a of the present embodiment is configured from a plurality of the main body part unit 600a formed by dividing the main body part 60a in its extending direction and is configured to be replaceable per the main body part unit 600a. It should be noted that the entire main body part 60a may be formed as a single replaceable road surface unit.

By configuring the road surface part 60 from road surface units such as the main body part units 600a as in the present embodiment, it becomes possible to replace at least a part of the road surface 63a.

For example, only the main body part unit 600a at the central part of the road surface part 60 in the extending direction (X axis direction) can be replaced to change a type of the pavement part 63 (e.g., materials, structures, surface profiles and the like) only at the central part. Also, the type of the pavement part 63 may be changed for every main body part unit 600a such that, for example, the friction coefficient changes in the extending direction of the road surface part 60.

On a lower surface of the base 62, a recessed part 622 that fits with a protruded part 612 provided on an upper surface of the frame 61 is provided. The main body part unit 600a is detachably attached on the frame 61 by placing the main body part unit 600a on the frame 61 such that the protruded part 612 and the recessed part 622 fit to each other and by fixing the main body part unit 600a to the frame 61 with a conventionally known fixing part such as bolts or cam levers.

In the present embodiment, the frame 61 is formed from a plurality of frame units 610 formed by dividing the frame 61 in its extending direction and is replaceable per the frame unit 610.

In the present embodiment, the frame unit 610 and the main body part unit 600a are formed in the same length and thus replacement per road surface unit 600 in which the main body part unit 600a is attached to the frame unit 610 is also possible.

In the present embodiment, the pavement part 63 is formed integrally with the base 62. However, the pavement part 63 may be configured to be detachable from and attachable to the base 62. For example, the pavement part 63 may be configured from a plurality of pavement part units 630 formed by dividing the pavement part 63 in its extending direction, and may be configured to be replaceable per pavement part unit 630. In this case, the pavement part unit 630 and a base unit 620 may be formed in the same length to make replacement per complex unit in which the pavement part unit 630 is attached to the base unit 620 (in other words, the main body part unit 600a in which the pavement part 63 is made detachable) possible. Also, the frame unit 610, the base unit 620 and the pavement part unit 630 may be assembled to form the road surface part unit 600 to make replacement per road surface part unit 600 possible.

As described above, in the present embodiment, a plurality of road surface part units 600 are connected to form the road surface part 60. By this configuration, it is possible to extend or shorten the road surface part 60 by adding or removing the road surface part unit 600. Furthermore, by configuring the plurality of road surface units to have the same structure, it becomes possible to efficiently manufacture the road surface part 60.

In the present embodiment, as with the road surface part 60, the track part 10 is divided into a plurality of track part units 100 in its extending direction. It is also possible to extend or shorten the track part 10 by adding or removing the track part unit 100. The track part unit 100 is formed in the same length as the road surface part unit 600. Therefore, it is possible to form the track part 10 and the road surface part 60 in the same length. The road surface part 60 and the track part 10 may also be configured to be possible to extend, shorten or partially replace per complex unit in which the track part unit 100 and the road surface part unit 600 are integrated.

In the road surface part 60 of the present embodiment, a simulated pavement simulating asphalt-paved road (i.e., a pavement of which influences on a tire such as wear volume of a tire are comparable with the actual asphalt-paved road) is formed as the pavement part 63. The simulated pavement is for example formed by shaping and curing simulated pavement material in which binder such as, for example, urethane resin or epoxy resin is added to aggregate formed by crushing (and further polishing and/or etching as necessary) ceramics with excellent wear resistance such as silicon carbide or alumina. By using such simulated pavement material, a simulated road surface with excellent wear resistance and stable road surface state (i.e., a simulated road surface that causes stable wear volume and the like to the test tire T) can be obtained. The wear volume of a tire can be adjusted by, for example, particle size of the aggregate and/or amount of the binder added.

The simulated pavement of the present embodiment has a single-layered structure. However, for example, a simulated pavement in which a plurality of layers formed from different materials are layered in a thickness direction may be used. Simulated pavements simulating flagstone pavements, brick pavement, concrete pavement and the like by, for example, adjusting types and/or particle size of the aggregate and/or adjusting types and/or amount of the binder may also be used.

The road surface 63a may also be formed to cause more (or less) damage on a tire than the actual road surface. It becomes possible to perform accelerated tire deterioration test by using the road surface 63a which has greater influence on a tire than the actual road surface.

The pavement part 63 may also be formed from actual pavement material (e.g., asphalt compound used for a superficial layer of an asphalt pavement). The pavement part 63 replicating or imitating not only a superficial layer of an actual pavement forming the road surface but also a lower layer structure of the actual pavement may also be used.

In the tire testing device 1 of the present embodiment, since the road surface 63a does not move during the test, the test can be performed in a state where foreign matter (e.g., water, snow, mud water, dirt, sand, gravel, oil or the like or matter simulating the aforementioned foreign matter) which has influence on performance of a tire is scattered on the road surface 63a. For example, by performing the test in a state where water is scattered on the road surface 63a, wet braking test can be performed.

(First Variation)

Figure 12:
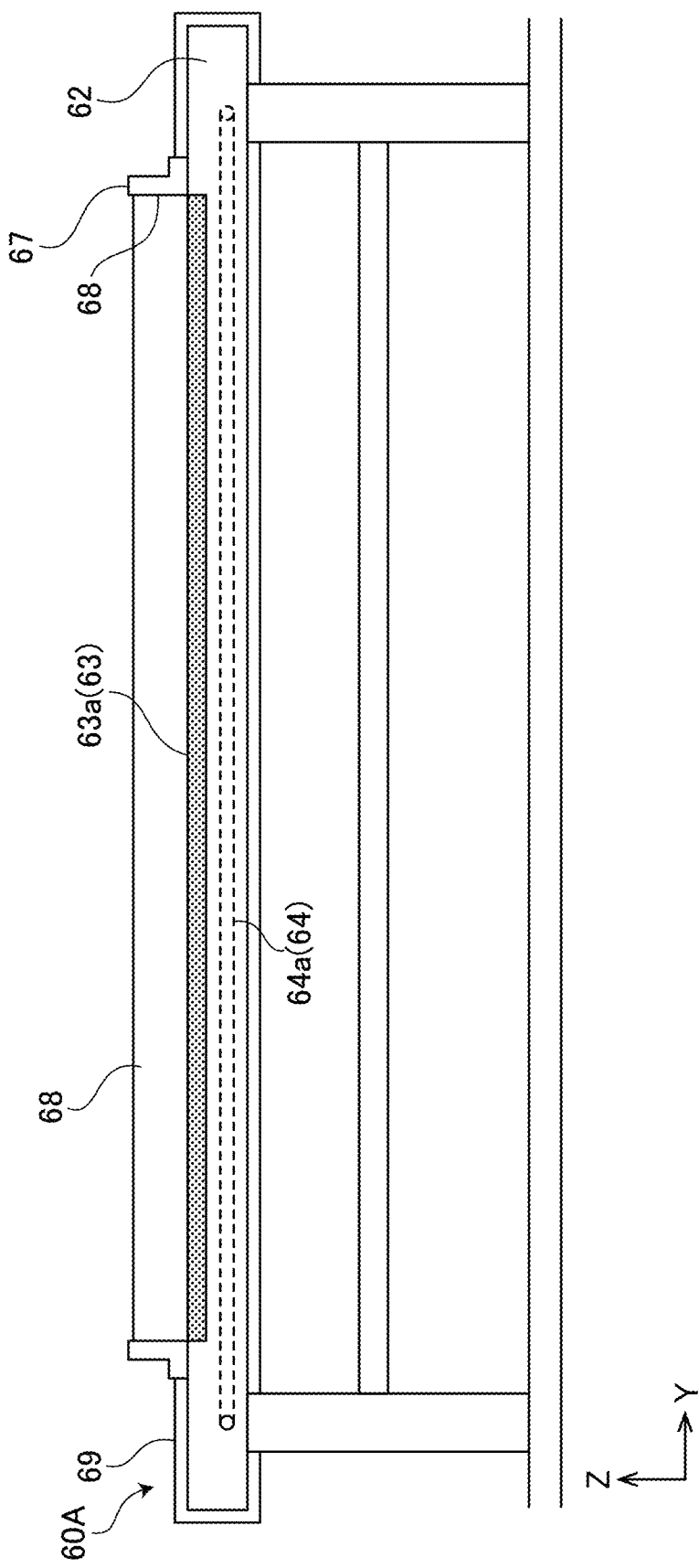
FIG. 12 is a transverse cross-sectional view of a first variation of the road surface part.

FIG. 12 is a transverse cross-sectional view of a first variation of the road surface part 60 (a road surface part 60A). The road surface part 60A includes a frame part 67 attached to the base 62. The frame part 67 is bonded to the base 62 to be watertight by caulking or the like and forms a basin 68 together with the base 62. Foreign matter (e.g., water, gravel, dirt, fallen leaves or the like) having influence on performance of a tire is put in the basin 68 to cover the road surface 63a. By using the basin 68, it becomes possible to thickly deposit foreign matter on the road surface 63a. The frame part 67 of this variation is attached on an upper surface of the base 62, but the frame part 67 may be attached on side faces of the base 62. The frame part 67 may also be attached on an upper surface of the pavement part 63.

The road surface part 60A includes a temperature adjusting part 64 configured to be capable of adjusting temperature of the road surface 63a. The temperature adjusting part 64 of the present variation has a flow channel 64a embedded in the base 62, a temperature sensor 64b configured to detect temperature of the road surface 63a, and a temperature adjusting device 64*c* (FIG. 10). The temperature sensor 64*b* is, for example, a contact type temperature sensor which uses a thermocouple, a thermistor or the like or a non-contact type temperature sensor such as an infrared sensor. The temperature adjusting device 64*c* is connected to the control part 72 and adjusts the temperature of the road surface 63*a* to a set temperature based on a command from the control part 72. Specifically, the temperature adjusting device 64*c* adjusts temperature of heat carrier (e.g., oil or water containing antifreeze liquid) based on detection result by the temperature sensor 64*b* and transmits the heat carrier to the flow channel 64*a*. It is possible to adjust the temperature of the road surface 63*a* to a predetermined temperature by causing the heat carrier of which temperature is adjusted by the temperature adjusting device to flow through the flow channel 64*a*. An outer surface of the base 62 is coated with heat insulating material 69 to stabilize the temperature of the road surface 63*a* and to improve heat use efficiency.

The temperature adjusting part 64 can adjust the temperature of the road surface 63*a* in a wide range from a low temperature (e.g., −40 degrees Celsius) up to a high temperature (e.g., 80 degrees Celsius). It is possible to form a frozen road surface by filling the basin 68 with water and setting the set temperature of the road surface 63*a* to below zero. That is, it is possible to perform ice braking test by using the road surface part 60A of the present variation. It is also possible to perform snow braking test in a state where the basin 68 is filled with snow.

The flow channel 64*a* is formed to meander at constant intervals within the base 62 in parallel with the road surface 63*a*. The base 62 is segmented into a plurality of sections (the base units 620) in its lengthwise direction and respective flow channels 64*a* are formed to respective sections. By this configuration, it becomes possible to adjust the temperature of the entire road surface 63*a* more evenly.

(Second Variation)

Next, a second variation of the road surface part 60 (a road surface part 60B) will be described. To the road surface part 60B, a load detecting part 65 configured to detect distribution of load the road surface receives from a tire tread of the test wheel W is provided.

Figure 13:
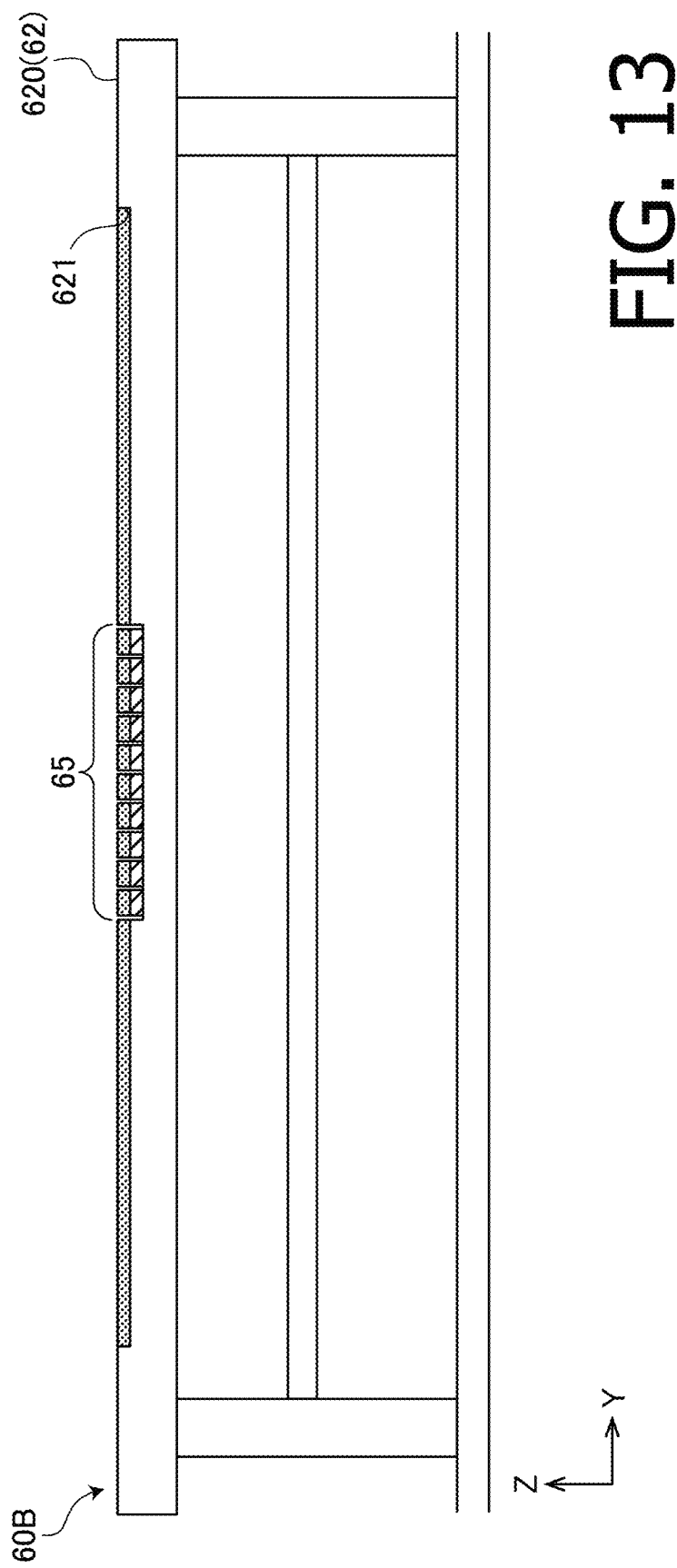
FIG. 13 is a transverse cross-sectional view of a second variation of the road surface part.
Figure 14:
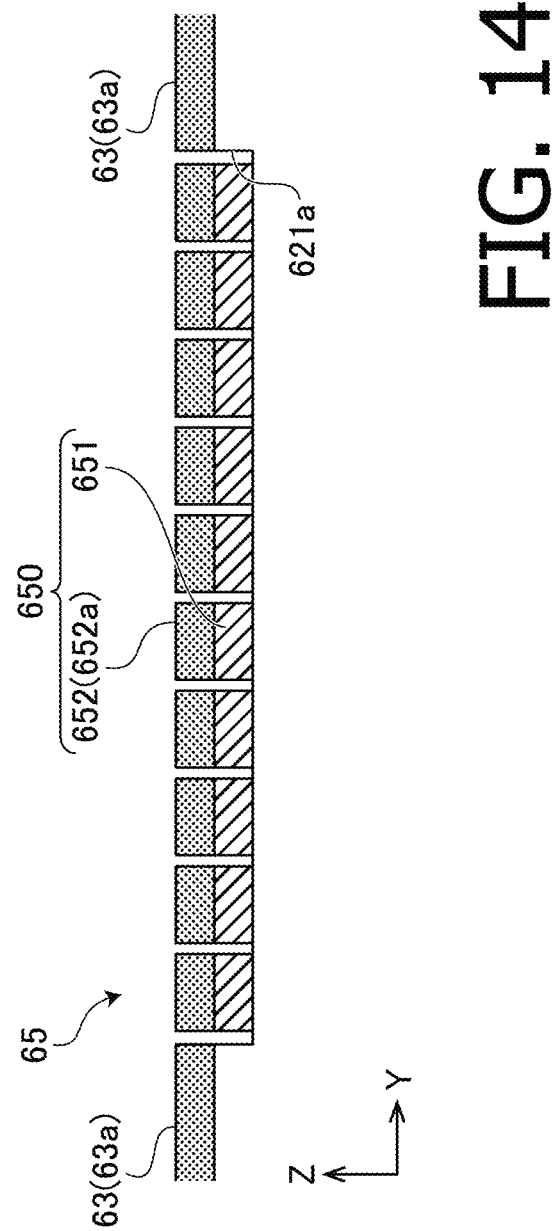
FIG. 14 is a transverse cross-sectional view of the second variation of the road surface part around a load detecting part.
Figure 15:
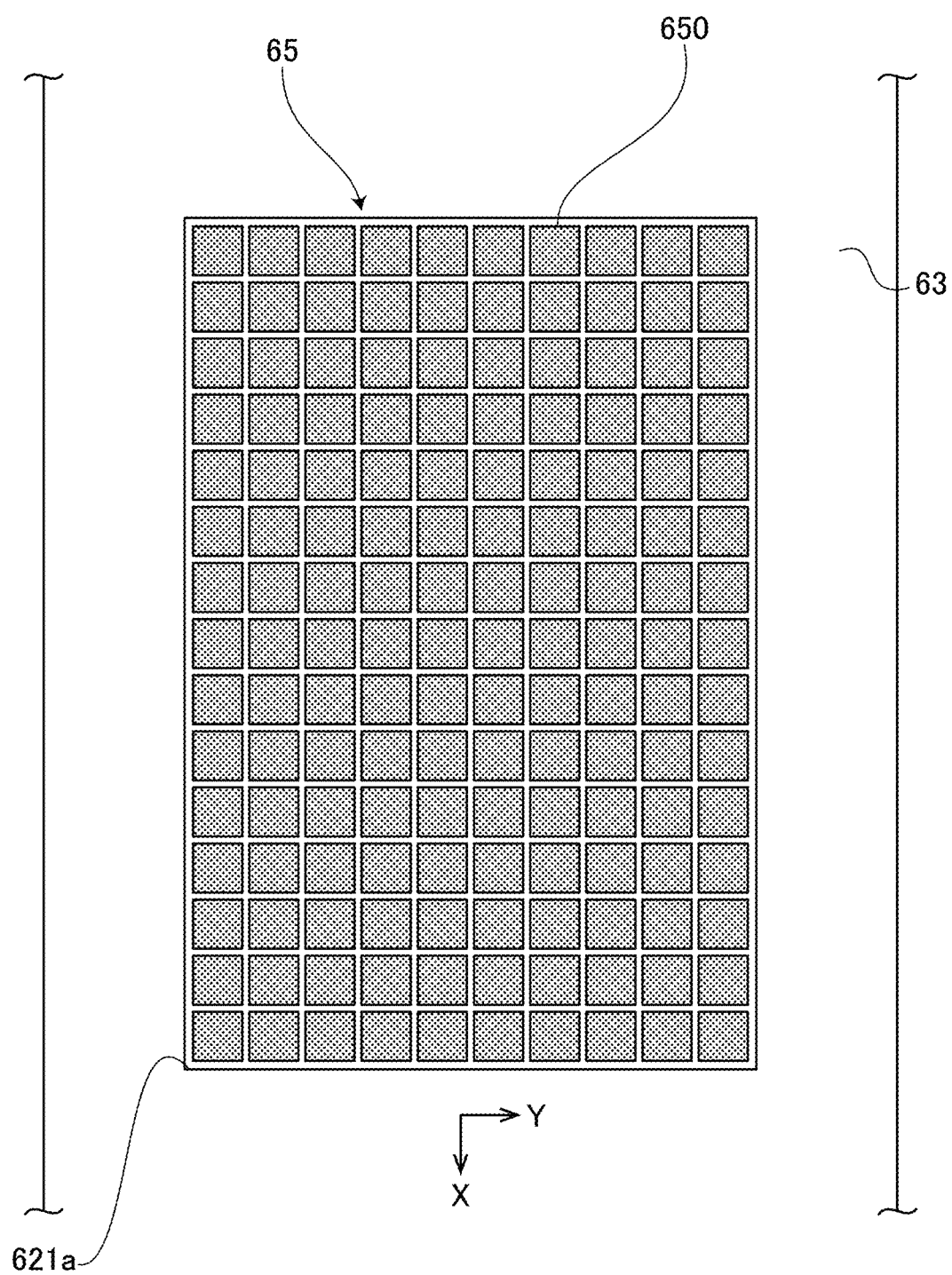
FIG. 15 is a plan view of the second variation of the road surface part around a load detecting part.

FIG. 13 is a transverse cross-sectional view of the road surface part 60B. FIGS. 14 and 15 are a transverse cross-sectional view and a plan view of and around the load detecting part 65 of the road surface part 60B, respectively.

To the bottom of the recessed part 621 formed on the upper surface of the base 62 of the road surface part 60B, a deep recessed part 621*a* (FIG. 14) being deeper than the surrounding portion is formed at substantially the center of the bottom in its lengthwise direction (X axis direction) and in its widthwise direction (Y axis direction).

As shown in FIG. 14, the deep recessed part 621*a* is not filled with the pavement part 63 and a plurality of load detecting modules 650 configuring the load detecting part 65 is laid in the deep recessed part 621*a*. The plurality of load detecting modules 650 are disposed at lattice points arranged in the X axis direction and the Y axis direction. In the present variation, 150 load detecting modules 650 are arranged at constant intervals (e.g., at 100 mm intervals) in 15 rows in the X axis direction and 10 rows in the Y axis direction, and are fixed to the bottom of the deep recessed part 621*a*. A width of the deep recessed part 621*a* (i.e., a width of the load detecting part 65) is sufficiently wider than a tread width of the test tire T and thus the entire tire tread of the test tire T can contact with the load detecting part 65.

As shown in FIG. 14, the load detecting module 650 is a module in which a pavement part 652 is attached on an upper surface of a piezoelectric three force components sensor 651. The three force components sensor 651 is a cylindrical piezoelectric element whose central axis is oriented in the Z axis direction. The pavement part 652 is a cuboidal member whose lengths in the X axis direction and in the Y axis direction are the same. It should be noted that the shapes of the three force components sensor 651 and the pavement part 652 may be other shapes. For example, the shape of the three force components sensor 651 may be cuboidal and the shape of the pavement part 652 may be cylindrical. Also, the shapes of the three force components sensor 651 and the pavement part 652 may be the same. An upper surface of the pavement part 652 is arranged perpendicular to the Z axis to form the road surface.

The pavement part 652 of the present variation is formed from the same material and in the same thickness as the pavement part 63. However, the material and the size of the pavement part 652 may be different from those of the pavement part 63. Also, the pavement part 652 may not be provided to the load detecting module 650 and the upper surface of the load detecting module 650 may be used as the road surface. In this case, a depth of the deep recessed part 621*a* may be set such that the upper surface of the load detecting module 650 is at the same height as an upper surface of the pavement part 63.

Temporal changes of the following three forces $f_R$, $f_T$ and $f_L$ that act on the road surface 652*a* of each load detecting module 650 (i.e., on the tire tread) are detected by the three force components sensor 651.

a) radial force $f_R$
b) tangential force $f_T$
c) lateral force $f_L$

It is possible to detect distribution and temporal change of force that the road surface receives from the tire tread of the test tire T (i.e., force that acts on the tire tread) by using the load detecting part 65.

Various processes are performed based on the load distribution (initial load profile) detected by the load detecting part 65 to generate final load profile data (measured values of the load profile). The measurement result of the load profile is displayed on a display device of the control system 1*a* for example as a three-dimensional CG image to visualize distribution of load acting on the tire tread.

In the following description, the load distribution that is detected by the load detecting part 65 (or a load detecting part 165 which will be described later) will be referred to as a detected load distribution (or detected values of the load distribution), and the load distribution that is finally obtained through various processes based on the detected load distribution will be referred to as a measured load distribution (or measured values of the load distribution).

In the present variation, image data of three profile images respectively representing distributions of the above-described three types of forces $f_R$, $f_T$ and $f_L$ is generated, and the three profile images are displayed on a screen of the display device simultaneously by arranging the profile images or by sequentially switching the profile images.

The detection of the load distribution is performed continuously at constant time intervals (e.g., at 5 msec intervals) and simultaneously by all the load detecting modules 650. Load measured by each load detecting module 650 is associated with measurement data measured by the six force components sensor 282 of the spindle 280 at the same timing and is stored in a storage device 721 of the control part 72 (or a server 77 connected to the control part 72 via for example a LAN).

By performing the tire test using the tire testing device 1 provided with the road surface part 60B of the present variation, since it is possible to measure loads acting on the test wheel W and the road surface simultaneously with the six force components sensor 282 on the test wheel W side and the load detecting part 65 on the road surface side, it becomes possible to obtain more detailed data concerning behaviors of the tire tread while running which could not be obtained with conventional tire testing devices.

In the present variation, the load detecting part 65 is provided only at the substantially central part of the road surface part 60B in the lengthwise direction and in the widthwise direction. However, the load detecting part 65 may be provided on the whole area of the road surface part 60B.

(Third Variation)

Next, a third variation of the road surface part 60 (a road surface part 60C) will be described. The road surface part 60C of the present variation is also provided with the load detecting part 165 configured to detect the distribution of the load the road surface receives from the tire tread of the test wheel W.

Figure 16:
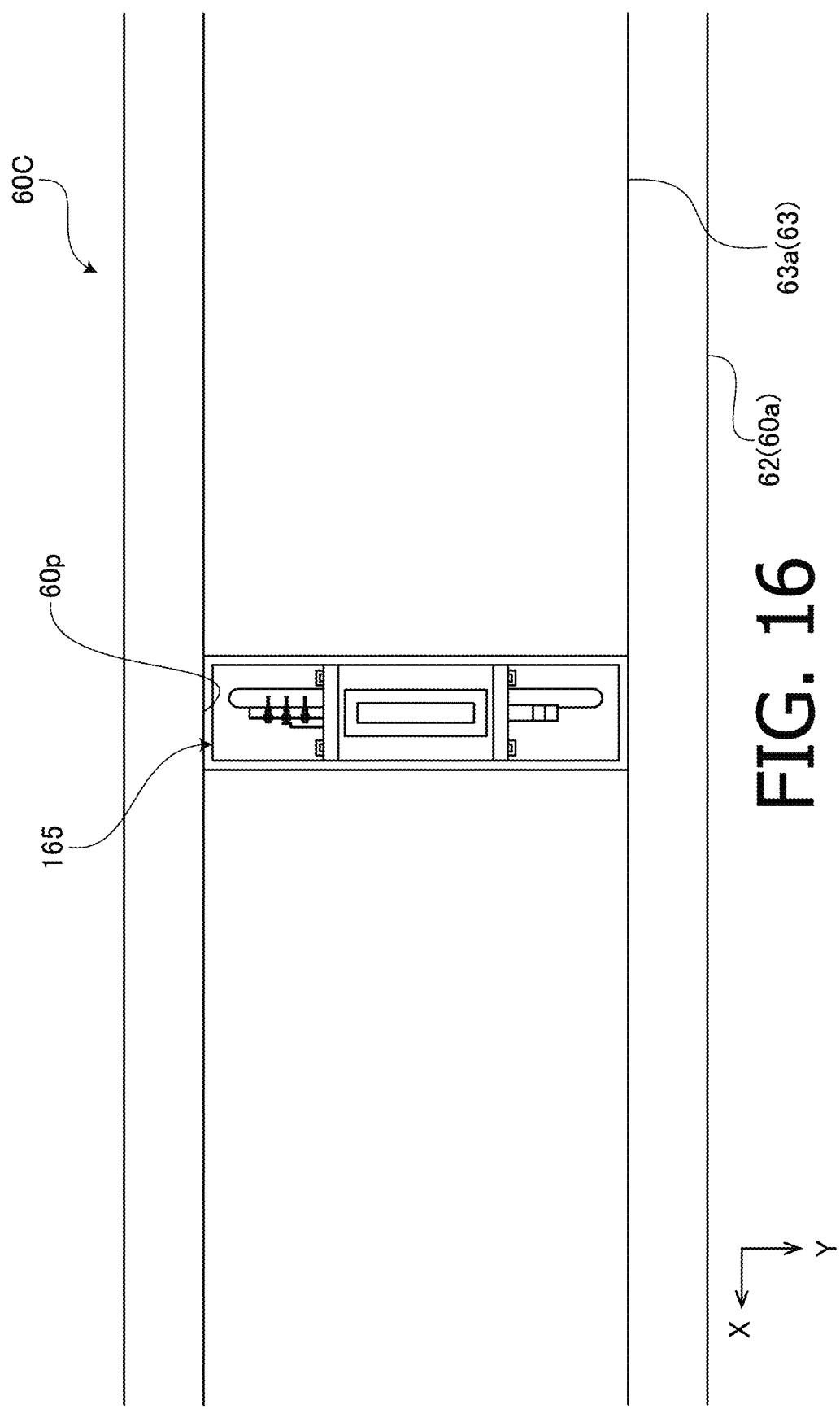
FIG. 16 is a plan view of a third variation of the road surface part around a load detecting part.
Figure 17:
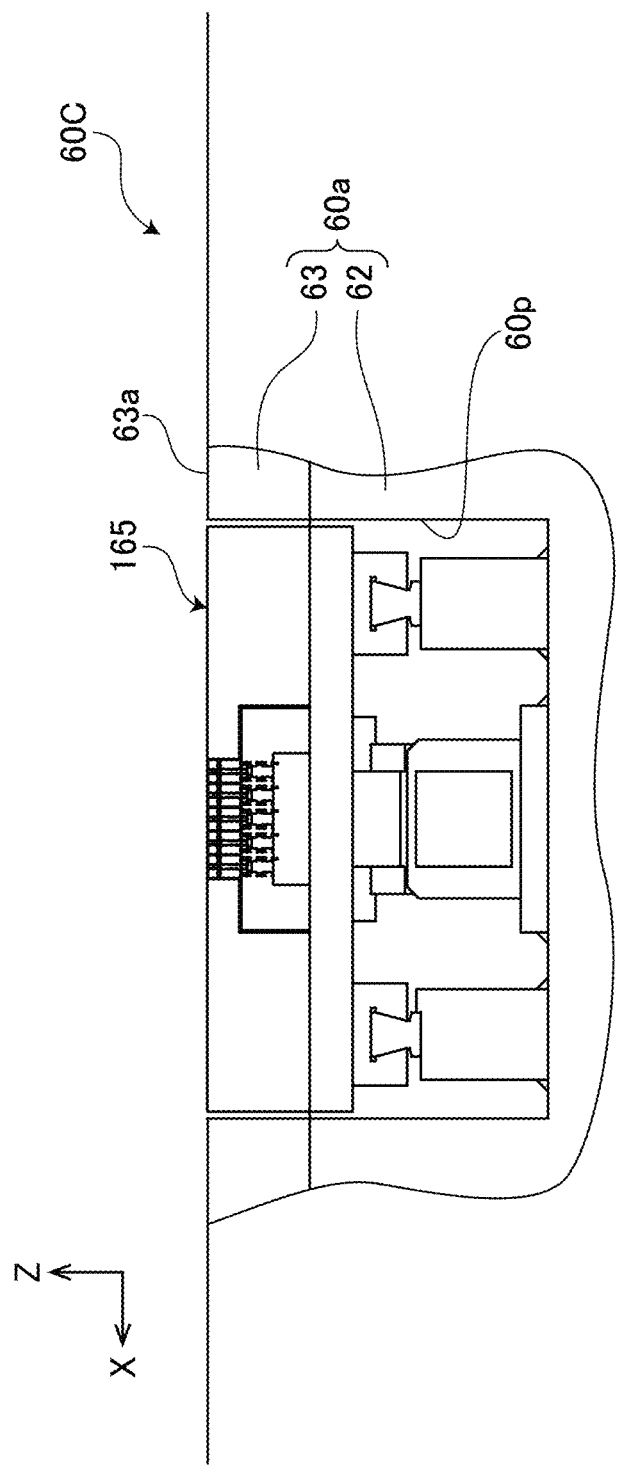
FIG. 17 is a side view of the third variation of the road surface part around the load detecting part.
Figure 18:
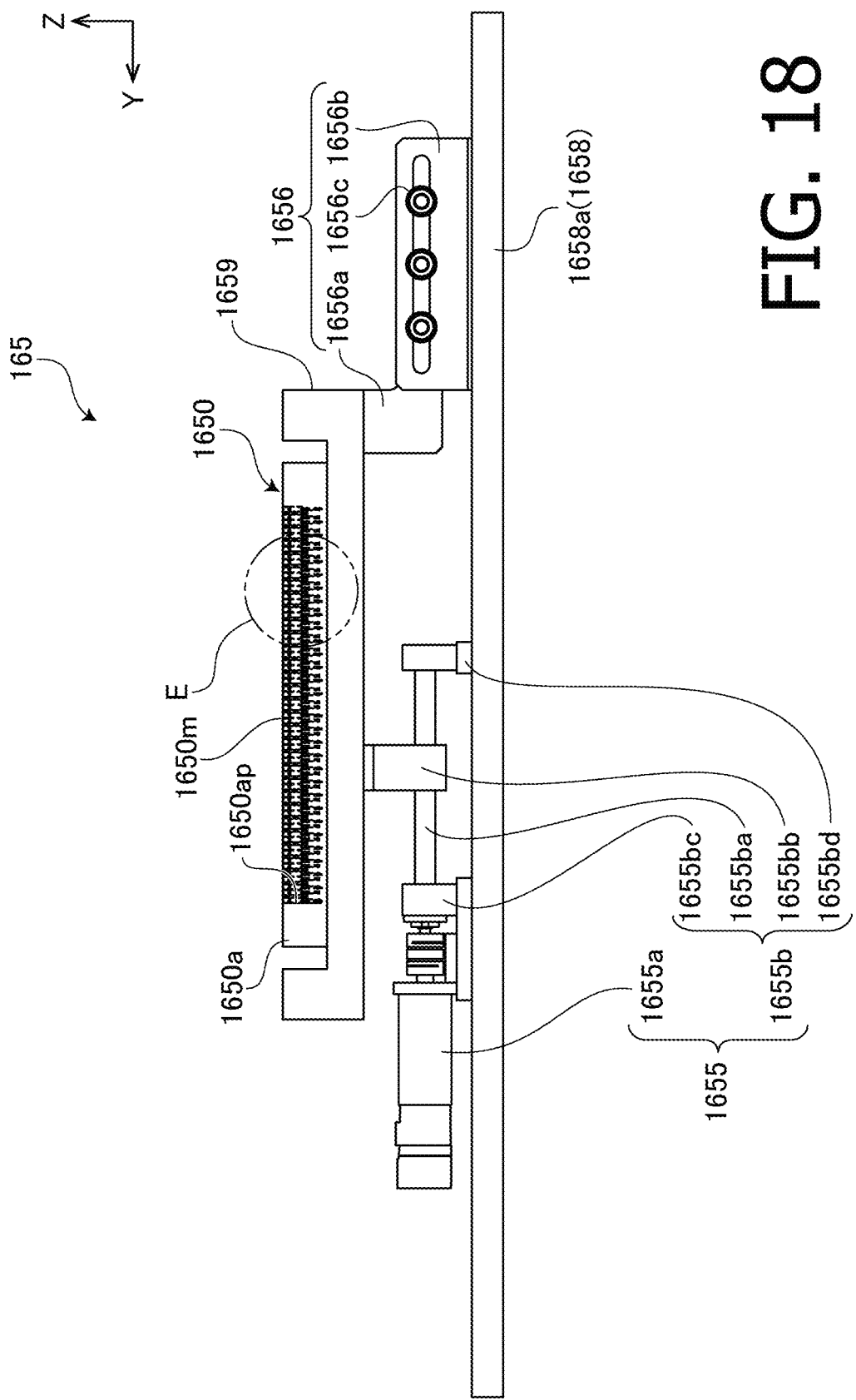
FIG. 18 is a front view of the third variation of the load detecting part.
Figure 19:
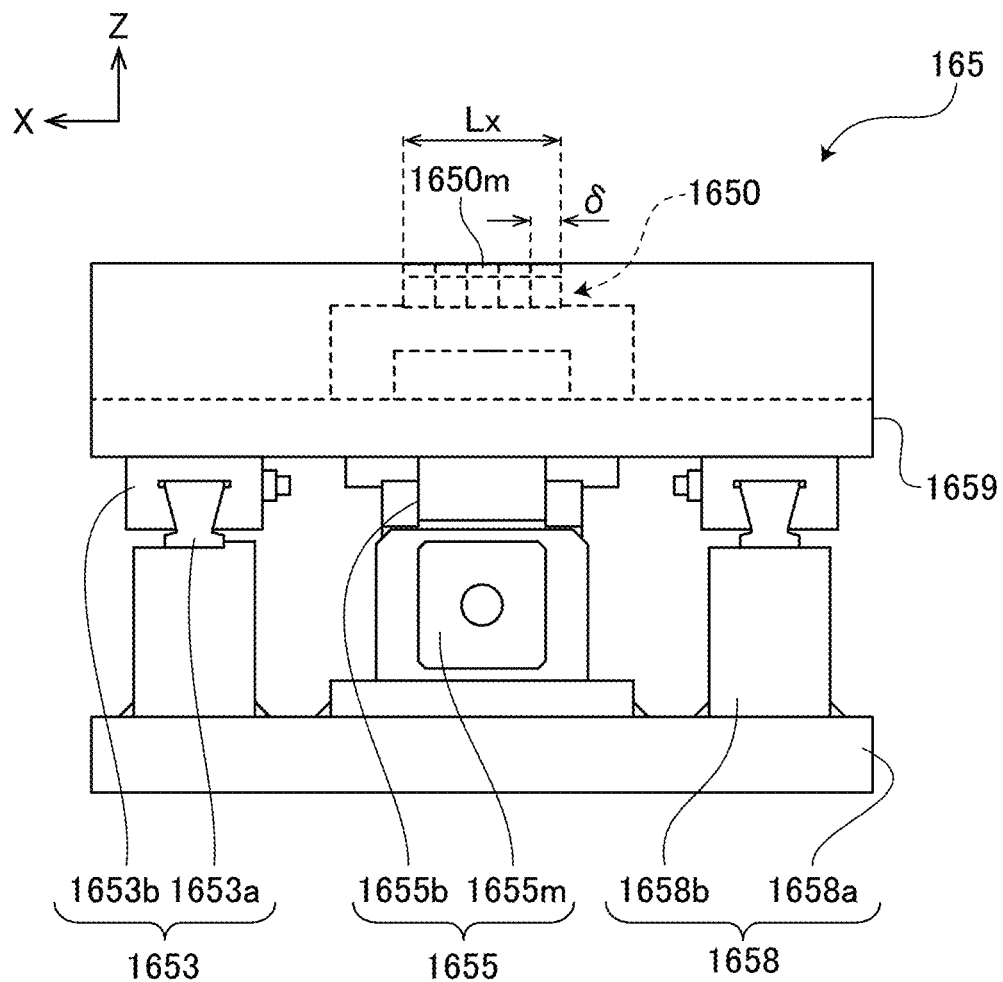
FIG. 19 is a side view of the third variation of the load detecting part.
Figure 20:
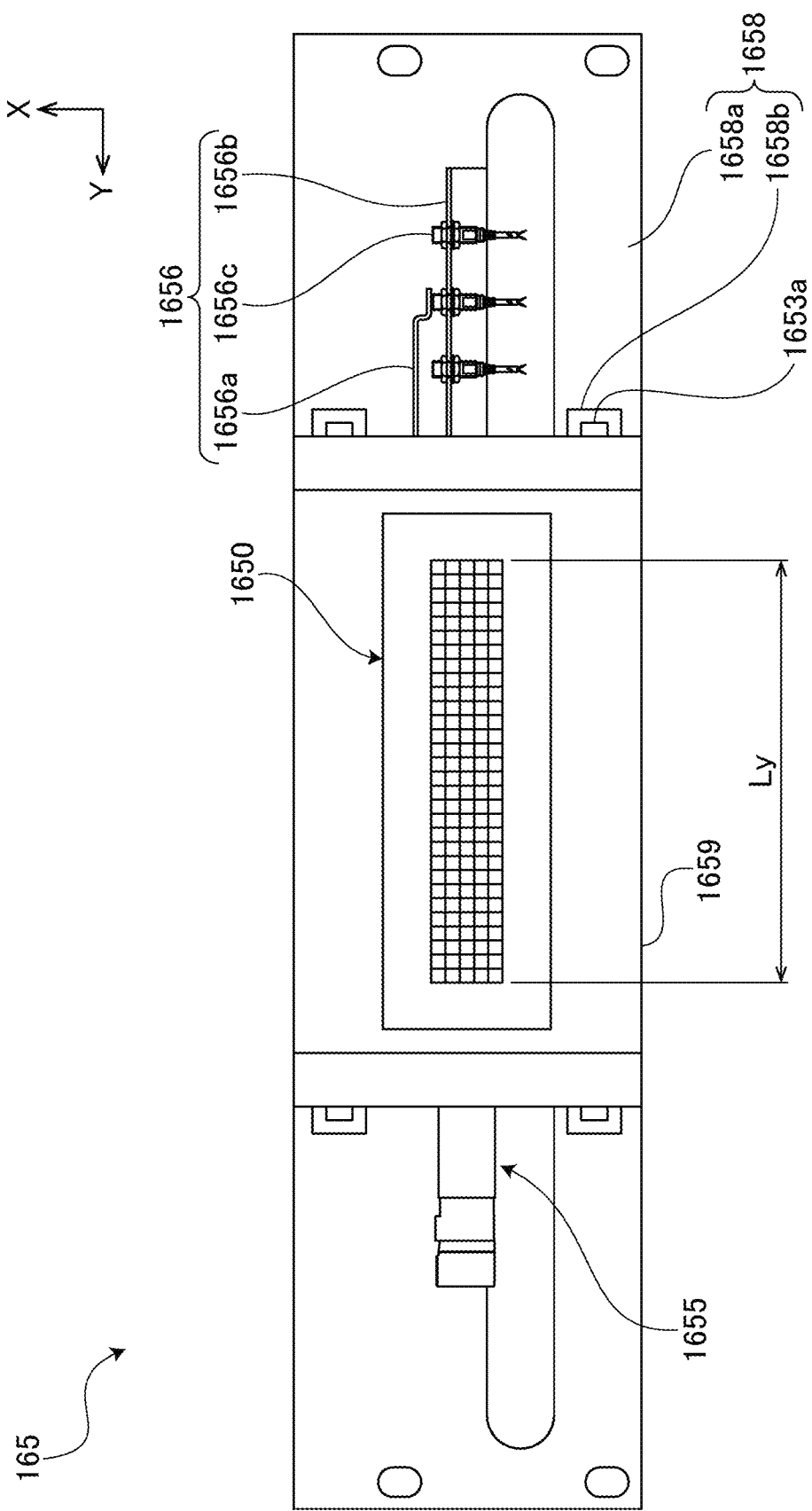
FIG. 20 is a plan view of the third variation of the load detecting part.

FIGS. 16 and 17 are a plan view and a side view of and around the load detecting part 165 of the road surface part 60C, respectively. FIGS. 18, 19 and 20 are a front view, a left side view and a plan view of the load detecting part 165, respectively.

As shown in FIGS. 16 and 17, on an upper surface of the main body part 60a of the road surface part 60C, a recessed part 60p extending in the Y axis direction is formed. The load detecting part 165 is accommodated inside the recessed part 60p and is fixed to the bottom of the recessed part 60p.

As shown in FIGS. 18 to 20, the load detecting part 165 includes a fixed frame 1658, a movable frame 1659, a pair of linear guides 1653, a sensor array unit 1650, a moving unit 1655, and a sensor position detecting part 1656. In FIG. 18, the linear guides 1653 and rail supporting parts 1658b of the fixed frame 1658 which will be described later are omitted. The movable frame 1659 is supported by the pair of linear guides 1653 to be movable in the Y axis direction (i.e., in a widthwise direction of the road surface part 60C). The sensor array unit 1650 is attached on an upper surface of the movable frame 1659. Details of the sensor array unit 1650 will be described later.

Figure 21:
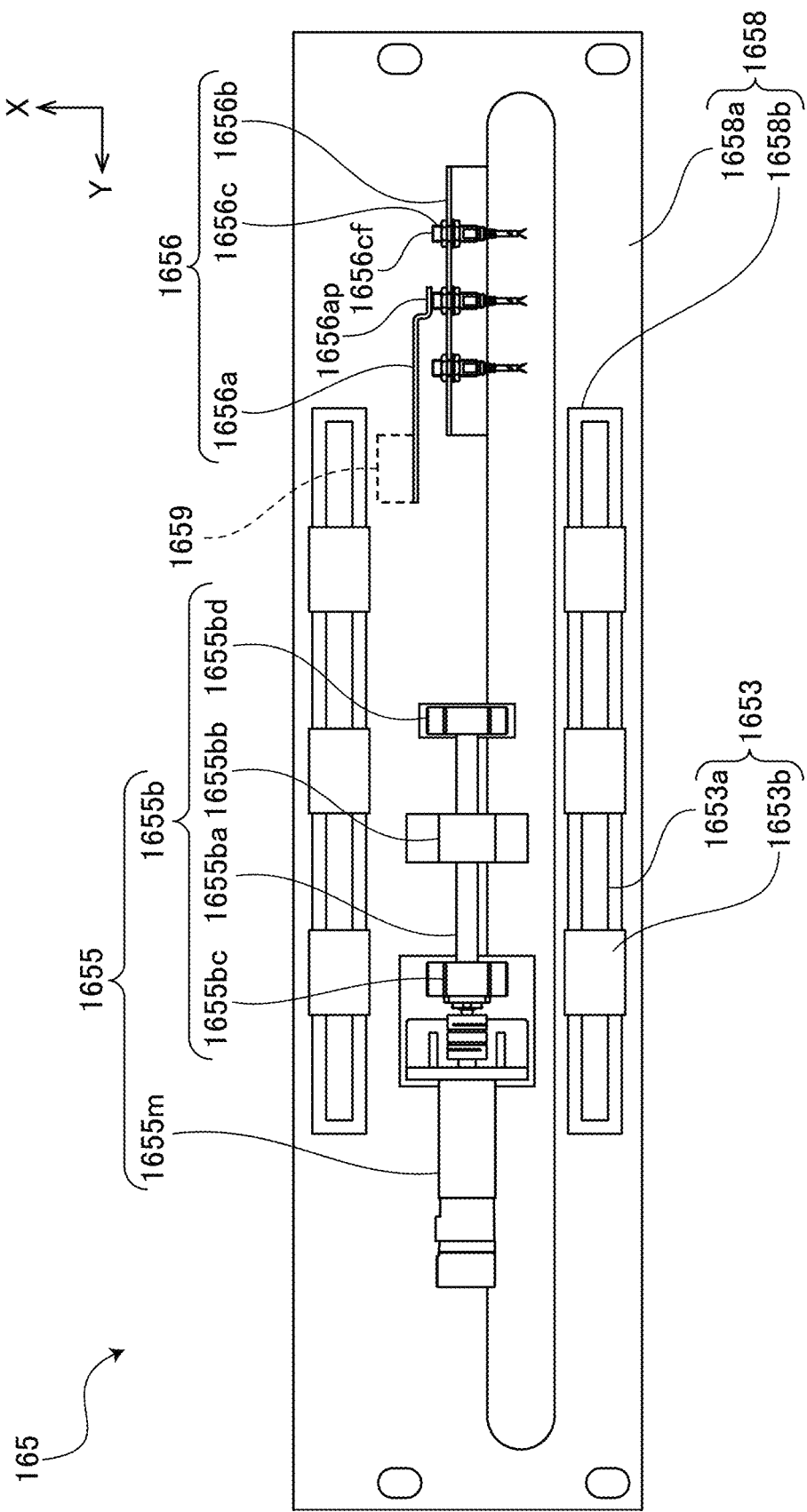
FIG. 21 is a plan view of the third variation showing a state where a movable part of the load detecting part is removed.

FIG. 21 is a plan view showing the load detecting part 165 in a state where the movable part (i.e., the movable frame 1659 and the sensor array unit 1650) is removed.

As shown in FIGS. 19 and 21, the fixed frame 1658 includes a substantially rectangular base plate 1658a, and a pair of rail supporting parts 1658b fixed on an upper surface of the base plate 1658a. The pair of rail supporting parts 1658b are arranged in the X axis direction with an interval therebetween while orienting their lengthwise directions in the Y axis direction.

The linear guide 1653 includes a rail 1653a extending in the Y axis direction, and a plurality of (in the present variation, three) carriages 1653b (hereinafter referred to as "runners 1653b") capable of travelling on the rail 1653a. The rail 1653a is attached on an upper surface of the rail supporting part 1658b. The runners 1653b are attached on a lower surface of the movable frame 1659. The movement of the movable frame 1659 in the Y axis direction is guided by the linear guides 1653.

The moving unit 1655 is arranged between the pair of rail supporting parts 1658b and the linear guides 1653. The moving unit 1655 includes a motor 1655m and a ball screw mechanism 1655b. The ball screw mechanism 1655b includes a ball screw 1655ba, a nut 165bb, a bearing part 1655bc, and a bearing part 1655bd.

The ball screw 1655ba is rotatably supported by a pair of the bearing parts 1655bc and 1655bd at both ends of the ball screw 1655ba. One end of the ball screw 1655ba is connected to a shaft of the motor 1655m. The nut 1655bb engaging with the wall screw 1655ba is attached on the lower surface of the movable frame 1659. As the ball screw 1655ba is rotated by the motor 1655m, the movable frame 1659 and the sensor array unit 1650 moves in the Y axis direction together with the nut 1655bb. That is, a position of the sensor array unit 1650 in the Y axis direction can be changed by rotationally driving the motor 1655m.

As shown in FIG. 21, the sensor position detecting part 1656 includes a movable arm 1655a, a plurality of (in the present variation, three) proximity sensors 1656c, and a sensor attaching part 1656b. The movable arm 1656a and the sensor attaching part 1656b of the present variation are formed by sheet metal processing but may be formed by other processing methods (e.g., by cutting, casting, injection molding of resin and the like). An end of the movable arm 1656a is fixed to the movable frame 1659 and the movable arm 1656a is movable in the Y axis direction together with the movable frame 1659. The sensor attaching part 1656b is attached to the fixed frame 1658.

The plurality of proximity sensors 1656c are attached to the sensor attaching part 1656b. The plurality of proximity sensors 1656c are arranged in the Y axis direction while orienting their detecting surfaces 1656cf in the X axis positive direction. In the present variation, the plurality of proximity sensors 1656c are arranged in the Y axis direction at constant intervals.

At a tip portion of the movable arm 1656a, a proximity part 1656ap adjacent to the proximity sensors 1656c are formed. In the present variation, the proximity part 1656ap is formed by bending the tip portion of the movable arm 1656a in a crank shape. The proximity part 1656ap is disposed at the same height as the detecting surfaces 1656cf of the plurality of proximity sensors 1656c. The detecting surfaces 1656cf of the plurality of proximity sensors 1656c are arranged within a movable range of the proximity part 1656ap in the Y axis direction with intervals therebetween.

Figure 22:
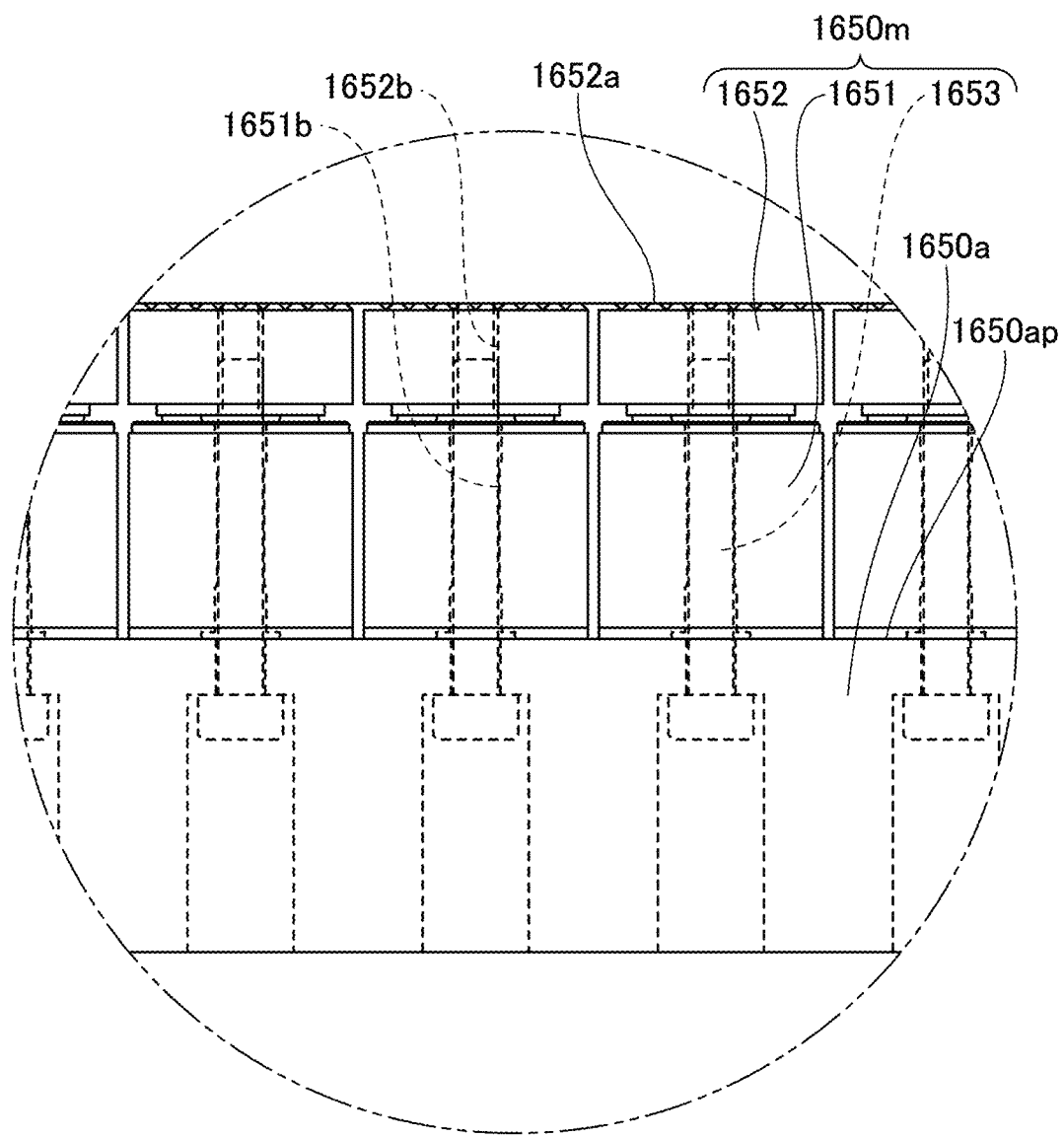
FIG. 22 is an enlarged view of an area E shown in FIG. 18.

FIG. 22 is an enlarged view of an area E surrounded by a chain double-dashed line in FIG. 18. As shown in FIGS. 18 and 22, the sensor array unit 1650 includes a frame 1650a and a plurality of (in the present variation, 150) load detecting modules 1650m. At the central part of an upper surface of the frame 1650a, a recessed part 1650ap long in the Y axis direction is formed. The plurality of load detecting modules 1650m are accommodated in the recessed part 1650ap and are fixed to the bottom of the recessed part 1650ap.

The plurality of load detecting modules 1650m are arranged in the X axis direction and the Y axis direction at constant intervals (e.g., with substantially no gap therebetween). In the present variation, 150 load detecting modules 1650m are arranged in 5 rows in the X axis direction and 30 rows in the Y axis direction.

The load detecting module 1650m includes a three force components sensor 1651, a pavement part 1652, and a bolt 1653. The three force components sensor 1651 and the pavement part 1652 are the same members as the three force components sensor 651 and the pavement part 652 of the second variation, respectively.

At the center of the cylindrical three force components sensor 1651, a hole 1651b penetrating in the Z axis direction is formed. At the center of the pavement part 1652, a bolt hole 1652b extending in the Z axis direction is formed. The load detecting module 1650 is integrated and fixed to the frame 1650a by the bolt 1653 inserted through the hole 1651b of the three force components sensor 1651 and screwed in the bot hole 1652b of the pavement part 1652. An upper surface of the pavement part 1652 is disposed horizontally to form a road surface 1652a. An area in the X axis direction and the Y axis direction where the load detecting modules 1650m are arranged is a detecting area of the sensor array unit 1650.

As shown in FIG. 10, the motor 1655m of the moving unit 1655 is connected to the control part 72 via a driver 1655a. The three force components sensor 1651 and the proximity sensor 1656c of the sensor position detecting part 1656 are connected to the measuring part 74 via a pre-amplifier 1651a and a pre-amplifier 1656ca, respectively. In FIG. 10, only one three force components sensor 1651, only one pre-amplifier 1651a, only one proximity sensor 1656c and only one pre-amplifier 1656ca are shown. Signals from the three force components sensors 1651 and the proximity sensors 1656c are amplified by the pre-amplifiers 1651a and the pre-amplifiers 1656ca, respectively, and are then converted into digital signals at the measuring part 74.

Next, a procedure for changing the position of the sensor array unit 1650 in the Y axis direction with the moving unit 1655 will be described. In an initial state shown in FIG. 21, the sensor array unit 1650 is disposed at a position where the proximity part 1656ap of the movable arm 1656a opposes the detecting surface 1656cf of the proximity sensor 1656c positioned at the center. As an instruction to move the sensor array unit 1650 to the left (in the Y axis positive direction) is provided through, for example, a user operation on a touch screen, the control part 72 transmits a command for an anti-clockwise rotation to the driver 1655a to move the sensor array unit 1650 in the Y axis direction. The driver 1655a which received the command for the anti-clockwise rotation supplies driving current that causes the motor 1655m to rotate in the anti-clockwise direction. As the motor 1655m is driven in the anti-clockwise direction by the drive current, the ball screw 1655ba rotates in the anti-clockwise direction together with the shaft of the motor 1655m, and the sensor array unit 1650 moves in the Y axis direction together with the nut 1655bb and the movable frame 1659.

As the sensor array unit 1650 moves in the Y axis direction, the proximity part 1656ap of the movable part 1656a moves away from the detecting surface 16556cf of the proximity sensor 1656c at the center and the proximity sensor 1656c at the center becomes less responsive to proximation. In time, the proximity part 1656ap of the movable arm 1656a reaches a position opposing the detecting surface 1656cf of the proximity sensor 1656c on the left (on the Y axis positive direction side). At this time, the proximity sensor 1656c on the left detects proximation and outputs a proximation signal indicating detection of proximation. The measuring part 74 which received the proximation signal through the pre-amplifier 1656ca notifies the control part 72 that the sensor array unit 1650 reached a fixed position on the left. The control part 72 which received the notification from the measuring part 74 transmits a command to stop driving to the driver 1655a. The driver 1655a which received the command to stop driving stops supplying driving current to the motor 1655m. The rotations of the shaft of the motor 1655m and the ball screw 1655ba thereby stop and the nut 1655bb and the sensor array unit 1650 also stop, and the displacement of the sensor array unit 1650 completes.

By providing the moving unit 1655, it becomes possible to shorten a length Ly of the detecting area of the sensor array unit 1650 in the Y axis direction to reduce the number of load detecting modules 1650m necessary to measure the load distribution, and thus it becomes possible to reduce cost necessary to manufacture and maintain the sensor array unit 1650.

Figure 23:
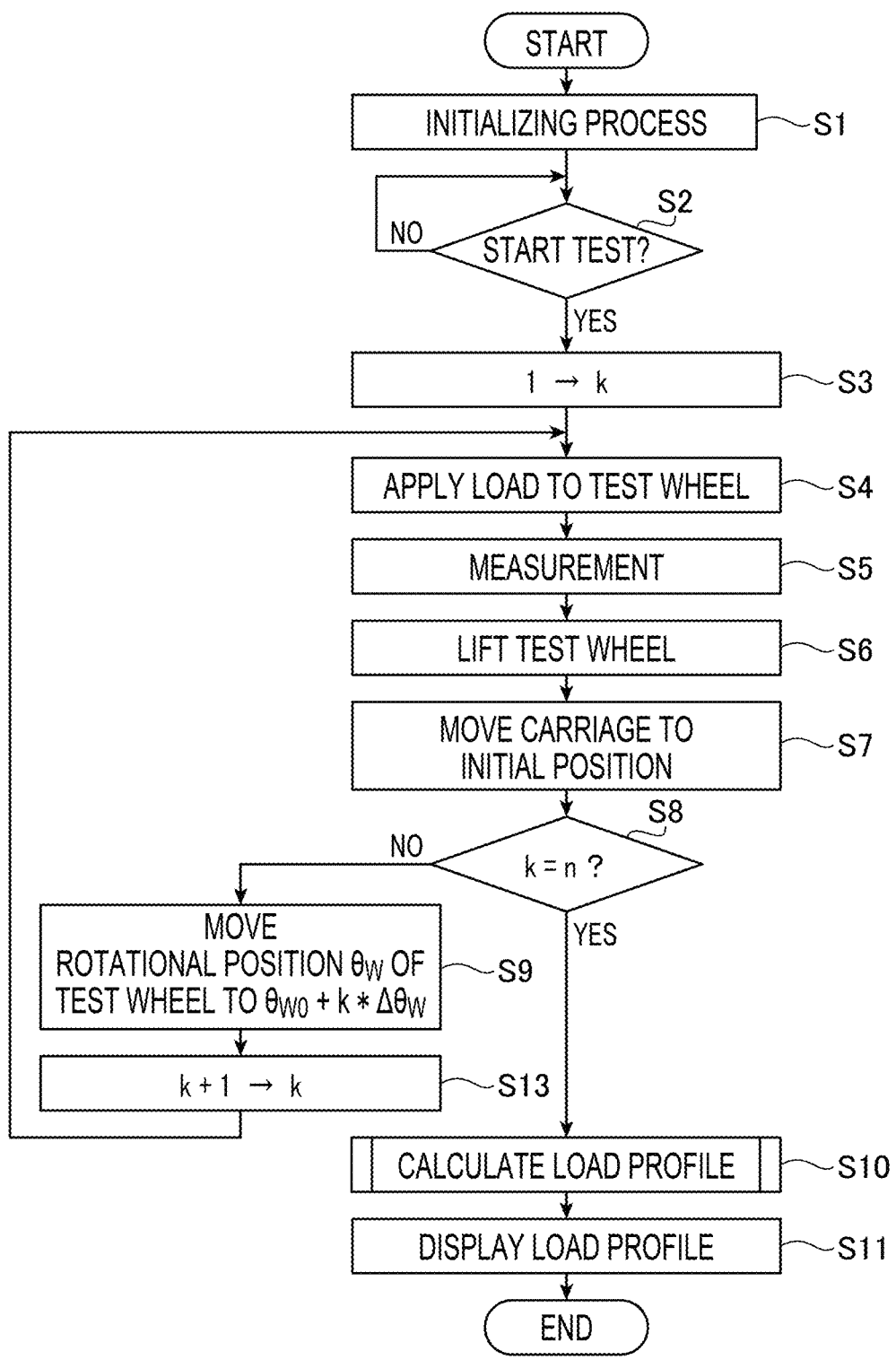
FIG. 23 is a flowchart showing a procedure for obtaining distribution of load acting on a tire tread in the third variation.

Next, a method for obtaining distribution of load acting on the tire tread by using the load detecting part 165 will be described. FIG. 23 is a flowchart showing a procedure of the method for obtaining distribution of load acting on the tire tread.

As the power of the tire testing device 1 is switched on, the control part 72 firstly execute an initializing process S1. As shown in FIG. 2, in an initial state, the carriage 20 is positioned at an initial position (an initial travelling position) $P_{X0}$ being set at a position near an end of its movable range in the X axis minus direction. The slide frame 44 (FIG. 4) is positioned at an initial position $P_{Z0}$ being set for example at a position near an upper end of its movable range. At the initial position $P_{Z0}$, the test wheel W is lifted off the road surface 63a and it is possible to attach and detach the test wheel W and to adjust alignment of the test wheel W. The slip angle and the camber are also adjusted to set values by the slip angle adjusting part 46 and the camber adjusting part 47, respectively.

In the state where the test wheel W is lifted off the road surface 63a, the servo motor 32 of the torque applying device 30 is driven and a rotational position $\theta_W$ of the test wheel W is moved to an initial rotational position $\theta_{W0}$ to complete the initializing process S1. A rotational position $\theta_M$ of the torque applying device 30 is controlled by the belt mechanism 50 and the belt mechanism 23 which use the toothed belts and thus the rotational position $\theta_M$ depends on a travelling position $P_X$ of the carriage 20. In the initial state, the torque applying device 30 is always positioned at an initial rotational position $\theta_{M0}$.

After completion of the initializing process S1, as an instruction to start the test is provided through, for example, a user operation on a touch screen (S2: YES), a number of measurement sets k is reset to 1 (S3), and the test wheel W is made to descend and contact the road surface 63a and a set load is applied to the test wheel W by the load adjusting part 45 (S4).

Then, the first measurement set S5 is executed. In the measurement set S5, the servo motors 141 of respective drive parts 14 are driven, and the carriage 20 travels at a set travelling speed and the test wheel W rotates at a peripheral speed that is substantially the same as the travelling speed of the carriage 20. The servo motor 32 of the torque applying device 30 is also driven and a set torque is applied to the test wheel W.

In the measurement set S5, forces acting on the road surface and the test wheel W are detected by the three force components sensor 1651 of the load detecting part 165 and the six force components sensor 282 of the spindle part 28, respectively, at predetermined time intervals (e.g., at 5 msec intervals). The time intervals of the detections by the three force components sensor 1651 and the six force components sensor 282 are appropriately set in accordance with test conditions (e.g., the travelling speed of the carriage 20 and required test accuracy).

In the measurement set S5, the travelling position $P_X$ of the carriage 20 and the rotational position $\theta_W$ of the test wheel W are calculated at predetermined time intervals. The travelling position $P_X$ of the carriage 20 is calculated from detection results by the built-in rotary encoders RE (FIG. 10)

of the servomotors 141 of the drive parts 14, reduction ratios of the reducers 142 and pitch diameters of the drive pulleys 52 of the belt mechanisms 50. The travelling position $P_X$ of the carriage 20 is a position of the rotation axis Ay of the test wheel W in the travelling direction of the carriage 20 (in the X axis direction).

The rotational position $\theta_W$ of the test wheel W is calculated based on detection results by the rotary encoder 39 of the torque applying device 30 and the built-in rotary encoder RE of the servo motor 32. Specifically, the rotational position $\theta_W$ of the test wheel W is calculated by adding the product of the rotational position $\theta_M$ of the shaft 321 of the servo motor 32 detected by the rotary encoder RE of the servo motor 32 (the initial rotational position $\theta_{M0}$ in the initial state being 0 [rad]) and a reduction ratio of the reducer 33 (i.e., a rotational position $\theta_S$ of the shaft 34) to a rotational position $\theta_H$ of the housing 31 of the torque applying device 30 detected by the rotary encoder 39.

It should be noted that a detecting part such as a rotary encoder for detecting a rotational position $\theta_T$ of an output from the torque applying device 30 (e.g., a rotational position of the spindle 280, the shaft 261 or the shaft 263) may be provided to detect the rotational position $\theta_W$ of the test wheel W directly with the detecting part.

The detection results by the three force components sensor 1651 and the six force components sensor 282 are associated with the detection results by the built-in rotary encoders RE of the servo motors 141 of the drive parts 14 (i.e., the travelling position $P_X$ of the carriage 20) and the detection result of the rotational position $\theta_W$ of the test wheel W that are detected at the same timing and are stored in the storage device 721 of the control part 72 (or in a storing part that the control part 72 can access such as the server 77 connected to the control part 72 via for example a LAN). Regarding the detection result by the three force components sensor 1651, only the result within a time period in which the test wheel W passes over the sensor array unit 1650 and the results within predetermined time periods before and after the aforementioned time period may be stored. With this configuration, it is possible to reduce an amount of data to be stored.

As the carriage 20 reaches a dead end of a travelling zone and stops, the test wheel W is lifted by the load adjusting part 45 to a height at which the test wheel W is lifted off the road surface 63a (e.g., the same height as the initial state) (S6). Then, the drive parts 14 are driven to move the carriage 20 to the initial position $P_{X0}$ (S7).

The above-described processes S4 to S7 are repeated until the number of measurement sets k reaches a preset number n (S8). If the number of measurement sets k has not yet reached the preset number n (S8: NO), the servo motor 32 of the torque applying device 30 is driven to move the rotational position $\theta_W$ of the test wheel W to a rotational position $\theta_{W0}+k*\Delta\theta_W$ (S9). Then, the control part 72 increments the number of measurement sets k by one (S13) and returns to S4. That is, the rotational position $\theta_W$ of the test wheel W at the original position $P_{X0}$ is changed by an angular width $\Delta\theta_W$ each time the number of measurement sets k increases by one.

The angular width $\Delta\theta_W$ is, for example, set to a value that is equal to or less than a central angle $\theta_{C1}$ of the test wheel W corresponding to a length Lx (FIG. 19) of the detecting area of the sensor array unit 1650 in the X axis direction (i.e., a rotation angle $\theta_{C1}$ of the test wheel W when the test wheel W rolls for a distance Lx). For example, the angular width day is set to a value that is the same as or slightly smaller than a central angle $\theta_{C2}$ of the test wheel W corresponding to an arrangement interval δ (FIG. 19) of the load detecting modules 1650m.

Also, the angular width $\Delta\zeta_W$ may for example be set to a value obtained by dividing $2\pi$ by the preset number n. In this case, the entire circumference of the test wheel W is measured without gap by the n measurement sets.

After completion of the preset n measurement sets (S8: YES), a load profile calculation S10 is executed.

Figure 24:
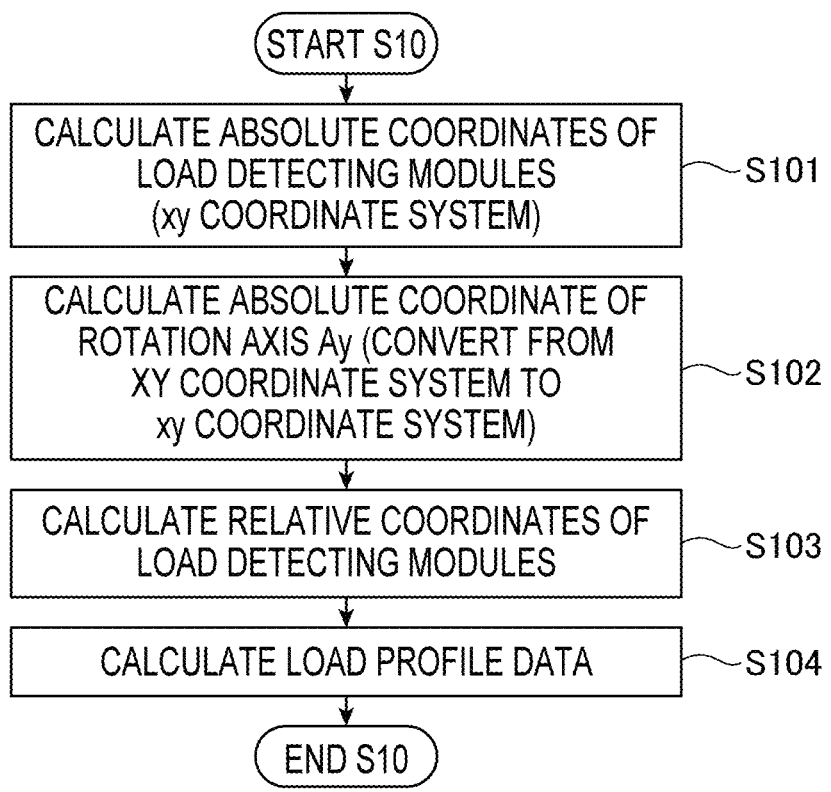
FIG. 24 is a flowchart showing a procedure for a load profile calculation in the third variation.

FIG. 24 is a flowchart showing a procedure for the load profile calculation S10. The load profile calculation S10 is a process for calculating the load profile data based on measurement results obtained by the n measurement sets S5.

The load profile data is data in which values of three types of forces acting on a tire (i.e., the radial force $f_R$, the tangential force $f_T$ and the lateral force $f_L$) are associated with plane coordinates on the road surface.

In the load profile calculation S10, firstly, calculation of coordinates of respective load detecting modules 1650m (S101) is executed. A coordinate of a point at the center of the upper surface of the load detecting module 1650m is defined as the coordinate of the load detecting module 1650m.

Figure 25:
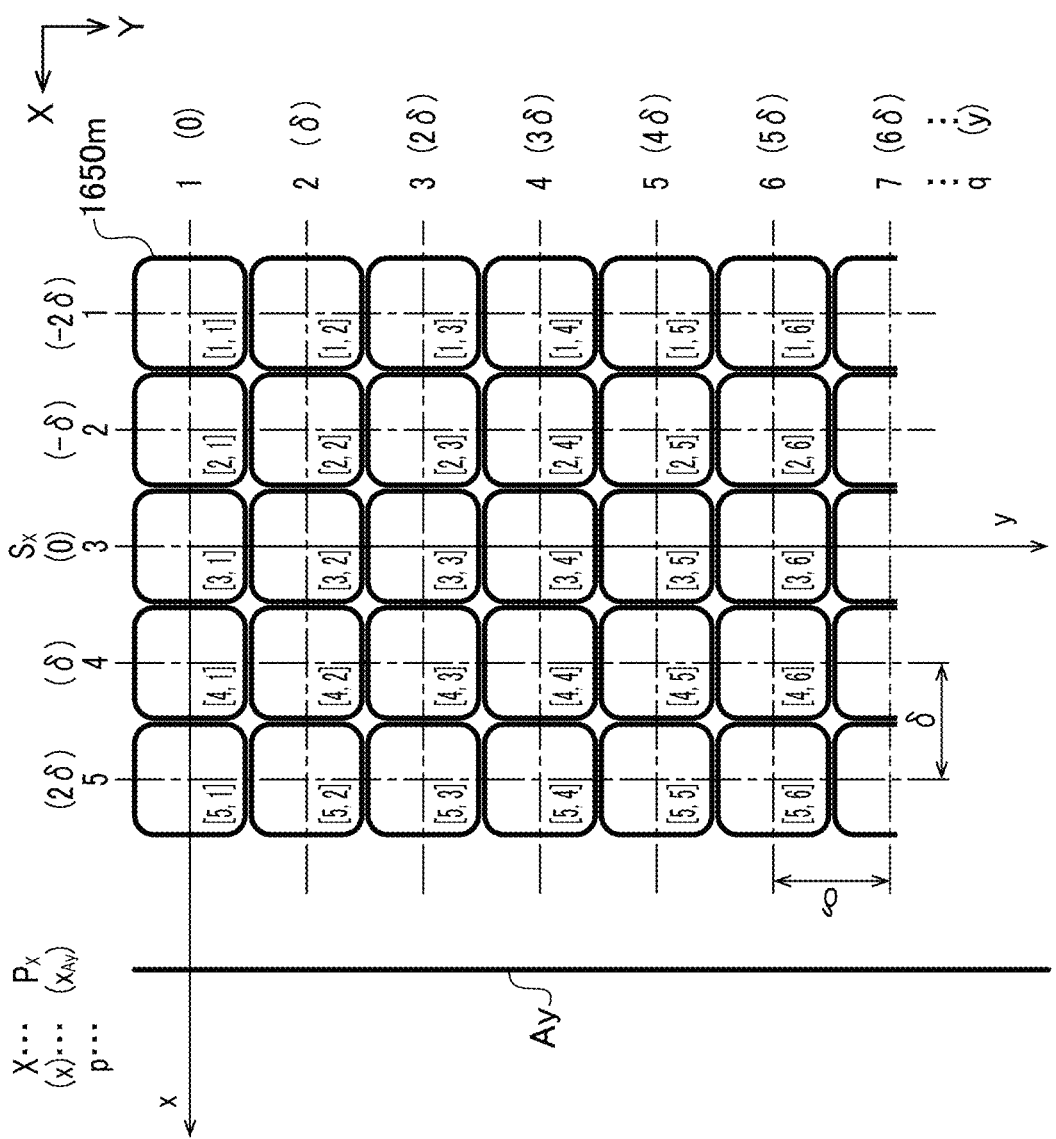
FIG. 25 is a plan view showing arrangement relationship between load detecting modules and a rotation axis of a test wheel in the third variation.

FIG. 25 is a plan view showing positional relationship between the load detecting modules 1650m and the rotation axis Ay of the test wheel W. As described above, in the present variation, 150 load detecting modules are arranged in 5 rows in the X axis direction and 30 rows in the Y axis direction. In the following description, a number of row of the load detecting module 1650m in the X axis direction will be represented by p, a number of row of the load detecting module 1650m in the Y axis direction will be represented by q, and a position of the load detecting module 650m will be represented by a pair of positive integer [p, q] (hereinafter referred to as an address [p, q]).

In the load profile calculation S10, an (x, y) coordinate system is used. The (x, y) coordinate system is a two-dimensional orthogonal coordinate system parallel to an (X, Y) coordinate system, the origin of the (x, y) coordinate system being the center of the upper surface of the load detecting module 1650m positioned at the address [3, 1]. That is, the xy plane is a plane on which the road surface of the road surface part 60C is disposed. In the description of the present variation, a coordinate whose origin is a fixed point is referred to as an absolute coordinate, and a coordinate whose origin is a movable point is referred to as a relative coordinate. In the load profile calculation S10, the absolute coordinates of respective load detecting modules 1650m are calculated.

In the present variation, the load detecting modules 1650m are arranged at constant intervals δ in the x axis direction and the y axis direction. Therefore, the coordinates x and y of the address [p, q] are calculated in accordance with the following formulas.

$$x=(p-3)*\delta$$

$$y=(q-1)*\delta$$

Then, an x coordinate of the rotation axis Ay of the test wheel W (hereinafter referred to as a "coordinate $x_{Ay}$") is calculated (S102). The coordinate $x_{Ay}$ is calculated in accordance with the following formula.

$$x_{Ay}=P_X-S_X$$

where
- $P_X$: X coordinate of the travelling position Px of the test wheel W (the rotation axis Ay)
- $S_X$: X coordinate of a position of the sensor array unit 1650 (y axis)

That is, in the process S102, the coordinates of the rotation axis Ay of the test wheel W are converted from the XY coordinate system into the xy coordinate system.

Then, relative positions (relative coordinates) of the load detecting modules 1650m with respect to the travelling position Px of the test wheel W (the rotation axis Ay) are calculated (S103). Relative coordinates $(x_r, y_r)$ of the load detecting modules 1650m are calculated in accordance with the following formulas. In the present variation, a load profile relating to the relative position is obtained.

$$x_r = x - x_{Ay}$$

$$y_r = y$$

Then, pieces of load profile data of three types of forces $f_R$, $f_T$ and $f_L$ are calculated by averaging all the measurement results (i.e., the radial forces $f_R$, the tangential forces $f_T$ and the lateral forces $f_L$ measured by respective load detecting modules 1650m) for every relative coordinate $(x_r, y_r)$ (S104). In the process S104, the pieces of load profile data may be calculated as proximate curved surfaces that can be obtained by regression analysis (e.g., curved surface fitting such as the least square method).

In the process S104, the pieces of load profile data may be calculated while taking into account the rotational position $\theta_W$ of the test wheel W. That is, the pieces of load profile data may be calculated for each rotational position $\theta_W$. In this case, the pieces of load profile data may be calculated while further taking into account symmetric property of a tread pattern of the test tire T about the rotation axis Ay. Specifically, the pieces of load profile data may be calculated for all the rotational positions $\theta_W$ that are same in phase of a cycle of the tread pattern.

In the present variation, by the n measurement sets, measurements for only one rotation of the test wheel W is performed. However, the number of measurement sets may be increased to perform measurements for a plurality of rotations. In the present variation, since a plurality of measurement sets are performed while changing the rotational position $\theta_W$ of the test wheel W at the initial position $P_{X0}$ by the central angle $\theta_{C2}$ of the test wheel W corresponding to the arrangement interval θ of the load detecting modules 1650m, resolution of the load profile data in the x axis direction is nearly the size of the arrangement interval of the load detecting modules 1650m. By repeatedly performing the measurement set while changing the rotational position $\theta_W$ by a further smaller angle (e.g., 1/10 of the central angle $\theta_{C2}$), substantial resolution in the x axis direction can be made smaller than the arrangement interval δ of the load detecting modules 1650m. For example, if the measurement sets are repeated while changing the rotational position $\theta_W$ by 1/m of the central angle $\theta_{C2}$ (m being a natural number), the substantial resolution in the x axis direction can be fined up to nearly δim.

In the present variation, the length Lx of the detecting area of the sensor array unit 1650 in the X axis direction is shorter than a length of the tire tread in the X axis direction. Therefore, the load distribution cannot be obtained for the entire tire tread only by causing the test wheel W to roll over the sensor array unit 1650 once.

Therefore, in the present variation, a method of measuring the load distribution on the tire tread in several separate measurements while shifting the rotational position $\theta_W$ of the test wheel W at the time the test wheel W rolls on the sensor array unit 1650 is adopted. By this method, it becomes possible to shorten the length of the detecting area of the sensor array unit 1650 in the X axis direction and reduce the number of load detecting modules 1650m necessary to measure the load distribution, and thus it becomes possible to reduce costs necessary to manufacture and maintain the sensor array unit 1650.

By repeatedly performing the measurement set while changing a y axis position of the sensor array unit 1650 with the moving unit 1655 by a predetermined interval, substantial resolution in the y axis direction can be made smaller. In this case, a motor capable of controlling position (e.g., a servo motor or a step motor) is used as the motor 1655m of the moving unit 1655. For example, by repeatedly performing the measurement set while changing the y axis position of the sensor array unit 1650 by 1 mm, the substantial resolution in the y axis direction can be fined to nearly 1 mm.

Then, the calculated load profiles are displayed on a display device of the interface part 76 (S11). FIGS. 26A-C show examples of displayed load profiles. FIG. 26A is a load profile image of the tangential forces $f_T$, FIG. 26B is a load profile image of the lateral forces $f_L$, and FIG. 26C is a load profile image of the radial forces $f_R$. The load profile images shown in FIGS. 26A-C are images generated by converting values of forces at respective positions $(x_r, y)$ into brightness.

Hereinabove, the illustrative embodiments according to aspects of the present disclosure have been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only exemplary illustrative embodiments of the present disclosure and but a few examples of their versatility are shown and described in the present disclosure. It is to be understood that the present disclosure is capable of use in various other combinations and environments and is capable of changes or modifications within the scope of the inventive concept as expressed herein. For instance, according to aspects of the present disclosure, the following modifications are possible.

In the above-described illustrative embodiments, the tire testing device 1 includes two belt mechanisms 50. However, the tire testing device 1 may include one belt mechanism 50 or three or more belt mechanisms 50.

In the above-described illustrative embodiments, the belt mechanisms 50 are driven by the power generated by the pair of drive parts 14. However, the belt mechanisms 50 may be configured to be driven by one drive part 14 or three or more drive parts 14.

In the above-described illustrative embodiments, the toothed belt and the toothed pulleys are used in each of the belt mechanisms 50, 23, 24. However, a flat belt or a V belt may be used in place of the toothed belt in one or more belt mechanisms. Other type of winding transmission mechanism such as a chain transmission mechanism or a wire transmission mechanism and other type of power transmission mechanism such as a ball screw mechanism, a gear transmission mechanism or a hydraulic mechanism may be used in place of the belt mechanism.

In the above-described illustrative embodiments, the power for driving the carriage 20 and the power for driving the test wheel W (the spindle 280) are supplied from the common drive parts 14 and are transmitted through the common belt mechanisms 50. However, the present disclosure is not limited to this configuration. For example, the power for driving the carriage 20 and the power for driving the test wheel W may be generated by separate drive parts and may be transmitted through separate power transmission part (e.g., separate belt mechanisms). In this case, driving of the drive part for driving the carriage and driving of the drive part for driving the test wheel needs to be synchronously controlled in order to synchronize the travelling speed of the carriage 20 and the peripheral speed of the test wheel W.

In the above-described illustrative embodiments, simple driving system and control system are realized by commonalizing a portion (the drive parts 14 and the drive belt mechanisms 50) of the mechanism for driving the carriage 20 (a carriage driving part) and a portion (the drive parts 14 and the drive belt mechanisms 50) of the mechanism for driving the test wheel W (a test wheel driving part). The commonalization of the carriage driving part and the test wheel driving part (especially the commonalization of the drive parts 14) is made possible due to reduction of load the drive parts 14 bear by the introduction of the torque applying device 30 to isolate a power source for controlling speed of the test wheel W from a power source for controlling torque of the test wheel W.

In the above-described third variation, it is made possible to measure the load profiles of a tire tread that is longer than the length Lx of the detecting area of the sensor array unit 1650 in the X axis direction by changing the rotational position $\theta_W$ of the test wheel W at the initial position $P_{Z0}$ for every measurement set. However, it becomes possible to measure the load profiles of a tire tread that is longer than the length Lx without changing the rotational position $\theta_W$ of the test wheel W at the initial position $P_{Z0}$ for every measurement set by providing a part that makes it possible to change a position of the sensor array unit 1650 in the X axis direction. The part that makes it possible to change the position of the sensor array unit 1650 in the X axis direction can for example be configured with a motor capable of controlling position and a feed screw mechanism (e.g., a ball screw mechanism) as with the moving unit 1655.

What is claimed is:

1. A tire testing device, comprising:
   a carriage configured to rotatably hold a test wheel provided with a test tire and being capable of travelling on a base along a road surface in a state where the test wheel is made to contact the road surface; and
   a driving system configured to drive the test wheel and the carriage,
   wherein the driving system comprises:
   a carriage driving part configured to drive the carriage with respect to the road surface in a predetermined speed;
   a test wheel driving part configured to drive the test wheel in a rotating speed corresponding to the predetermined speed;
   a driving part configured to generate power to be used to drive the carriage and the test wheel; and
   a power distributing part configured to distribute power generated by the driving part to the carriage driving part and the test wheel driving part.

2. A tire testing device, comprising:
   a carriage configured to rotatably hold a test wheel provided with a test tire and being capable of travelling on a base along a road surface in a state where the test wheel is made to contact the road surface; and
   a driving system configured to drive the test wheel and the carriage,
   wherein the driving system comprises:
   a driving part configured to generate power to be used to drive the carriage and the test wheel; and
   a first winding transmission mechanism configured to transmit the power generated by the driving part,
   wherein the first winding transmission mechanism comprises:
   a drive pulley coupled to an output shaft of the driving part;
   a driven pulley held by the carriage and coupled to the test wheel; and
   a first winding intermediate node wound around the drive pulley and the driven pulley,
   wherein the first winding intermediate node:
   has a first portion and a second portion stretched in a travelling direction of the carriage and configured to be driven in directions opposite to each other;
   passes over the driven pulley at the first portion; and
   is fixed to the carriage at the second portion.

3. The tire testing device according to claim 2, wherein:
   the driving system comprises a secondary power transmitting part coupled to the first winding transmission mechanism and configured to transmit a portion of the power transmitted by the first winding transmission mechanism to the test wheel, and
   the driven pulley is coupled to an input shaft of the secondary power transmitting part.

4. The tire testing device according to claim 2, wherein:
   the driving system comprises a pair of the driving part,
   the first winding transmission mechanism comprises a pair of the drive pulleys respectively coupled to output shafts of the pair of driving part, and
   the first winding intermediate node forms a loop and is wound around the pair of drive pulleys and the driven pulley.

5. The tire testing device according to claim 2,
   wherein the first winding intermediate node is a toothed belt having core wires made of steel wires.

6. The tire testing device according to claim 2,
   wherein the first winding intermediate node is a toothed belt having carbon core wires.

7. The tire testing device according to claim 2,
   wherein the driving system comprises a test wheel driving part configured to drive the test wheel, the test wheel driving part comprising:
   two driving parts; and
   a power coupling part configured to couple power generated by the two driving parts,
   wherein the two driving parts include:
   a first driving part mounted on the base; and
   a second driving part mounted on the carriage.

8. The tire testing device according to claim 2,
   wherein the driving system comprises a test wheel driving part configured to drive the test wheel, the test wheel driving part comprising:
   a rotational motion supplying part configured to supply rotational motion of a rotating speed corresponding to a speed of the carriage; and a torque applying part configured to apply a predetermined torque to the test wheel by changing a phase of the rotational motion supplied from the rotational motion supplying part.

9. The tire testing device according to claim 8,
wherein the rotational motion supplying part comprises a first motor mounted on the base; and
wherein the torque applying part comprises a second motor mounted on the carriage.

10. The tire testing device according to claim 9,
wherein the torque applying part comprises a power coupling part configured to couple power generated by the first motor and power generated by the second motor.

11. The tire testing device according to claim 10,
wherein the torque applying part comprises:
a rotating frame to which the second motor is attached and configured to be rotationally driven by the power generated by the first motor; and
a shaft driven by the second motor,
wherein the shaft and the rotating frame are concentrically arranged.

12. The tire testing device according to claim 11,
wherein the torque applying part comprises a pair of bearing parts configured to rotatably support the rotating frame,
wherein the rotating frame is cylindrical and has:
a motor accommodating part configured to accommodate the second motor; and
a pair of shaft parts provided on both sides in an axial direction of the motor accommodating part with the motor accommodating part therebetween and having diameters smaller than the motor accommodating part,
the rotating frame being rotatably supported at the pair of shaft parts by the pair of bearing parts,
wherein one of the shaft parts is cylindrical and the shaft penetrates through a hollow portion of the cylindrical shaft part, and
wherein a bearing configured to rotatably support the shaft is provided on an inner periphery of the shaft part.

13. The tire testing device according to claim 8,
wherein the secondary power transmitting part comprises:
a second shaft configured to be driven by the torque applying part;
a rotatably supported spindle to which the test wheel is coaxially and detachably attached;
a bearing configured to rotatably support the second shaft; and
a slide-type constant velocity joint configured to couple the second shaft to the spindle.

14. The tire testing device according to claim 8,
wherein the test wheel driving part comprises:
a primary power transmitting part configured to transmit power supplied from the rotational motion supplying part; and
a secondary power transmitting part mounted on the carriage and coupled to the primary power transmitting part to transmit power transmitted by the primary power transmitting part to the test wheel,
wherein the primary power transmitting part comprises a first winding transmission mechanism, the first winding transmission mechanism comprising:
a pair of fixed pulleys arranged across an area where the carriage can travel;
a moving pulley held by the carriage; and
a first winding intermediate node wound around the pair of fixed pulleys and the moving pulley,
wherein at least one of the fixed pulleys is a drive pulley coupled to an output shaft of the rotational motion supplying part, and
wherein the moving pulley is a driven pulley and is coupled to an input shaft of the secondary power transmitting part.

15. The tire testing device according to claim 14,
wherein the secondary power transmitting part comprises a second winding transmission mechanism, the second winding transmission mechanism comprising:
a drive pulley coupled to the moving pulley of the first winding transmission mechanism;
a driven pulley coupled to the rotating frame of the torque applying part; and
a second winding intermediate node wound around the drive pulley and the driven pulley of the second winding transmission mechanism.

16. The tire testing device according to claim 14,
wherein the secondary power transmitting part comprises a rotatably supported spindle,
wherein a tip portion of the spindle is configured such that the test wheel can be coaxially attached and detached, and
wherein the spindle is provided with a force sensor capable of detecting force acting on the test wheel.

17. The tire testing device according to claim 16,
wherein the carriage comprises:
a main frame;
a pivoting frame configured to be pivotable with respect to the main frame about a vertical line perpendicular to the road surface; and
a slide frame configured to be slidable with respect to the main frame in a vertical direction perpendicular to the road surface,
wherein the spindle is supported by the main frame via the pivoting frame and the slide frame.

18. The tire testing device according to claim 17,
wherein the carriage comprises:
a curved guideway configured to guide pivoting of the pivoting frame about the vertical line;
a linear guideway configured to guide movement of the slide frame in the vertical direction;
a load adjusting part configured to be capable of adjusting load acting on the test wheel by moving the slide frame in the vertical direction; and
a slip angle adjusting part configured to be capable of adjusting a slip angle of the test wheel with respect to the road surface by pivoting the pivoting frame about the vertical line.

19. The tire testing device according to claim 17,
wherein the slide frame is configured to support the spindle to be rotatable about a horizontal axis perpendicular to both a center line of the spindle and the vertical line.

20. The tire testing device according to claim 19,
comprising a camber adjusting part configured to be capable of adjusting a camber of the test wheel with respect to the road surface by rotating the spindle about the horizontal axis.

21. A tire testing device, comprising:
a carriage configured to rotatably hold a test wheel provided with a test tire and being capable of travelling on a base along a road surface in a state where the test wheel is made to contact the road surface; and a driving system configured to drive the test wheel and the carriage, wherein the driving system comprises a test wheel driving part configured to drive the test wheel, the test wheel driving part comprising:

a rotational motion supplying part configured to supply rotational motion of a rotating speed corresponding to a speed of the carriage; and a torque applying part configured to apply a predetermined torque to the test wheel by changing a phase of the rotational motion supplied from the rotational motion supplying part.

22. A tire testing device, comprising:

a carriage configured to rotatably hold a test wheel provided with a test tire and being capable of travelling on a base along a road surface in a state where the test wheel is made to contact the road surface; and a driving system configured to drive the test wheel and the carriage, wherein the driving system comprises a test wheel driving part configured to drive the test wheel, the test wheel driving part comprising:

two driving parts configured to generate power for rotationally driving the test wheel; and a power coupling part configured to couple power generated by the two driving parts, wherein the two driving parts include:

a first drive part mounted on the base; and a second drive part mounted on the carriage.

* * * * *